US007966228B2

(12) United States Patent
Perrier et al.

(10) Patent No.: US 7,966,228 B2
(45) Date of Patent: Jun. 21, 2011

(54) SYSTEMS AND METHODS FOR ENABLING INFORMATION MANAGEMENT INCORPORATING A PERSONAL COMPUTING DEVICE

(75) Inventors: R. Sylvain Perrier, Newmarket (CA); Russell Harper, Toronto (CA); Robin Harrison, East Mount Albert (CA); Michael Fedorov, Richmond Hill (CA); Jiang Zhao, Scarborough (CA); Denys Montuzenko, Mississauga (CA); Robert Segal, Toronto (CA); Harold Springer, Toronto (CA); Jeremy List, Newmarket (CA); Lucy List, Newmarket (CA)

(73) Assignee: Mercatus Technologies Inc., Toronto (CA)

( * ) Notice: Subject to any disclaimer, the term of this patent is extended or adjusted under 35 U.S.C. 154(b) by 1173 days.

(21) Appl. No.: 11/412,871

(22) Filed: Apr. 28, 2006

(65) Prior Publication Data
US 2006/0265238 A1 Nov. 23, 2006

Related U.S. Application Data

(60) Provisional application No. 60/675,843, filed on Apr. 29, 2005.

(51) Int. Cl.
*G06Q 10/00* (2006.01)

(52) U.S. Cl. .......................................... 705/28; 705/22
(58) Field of Classification Search .................... 705/22, 705/28, 500
See application file for complete search history.

(56) References Cited

U.S. PATENT DOCUMENTS

| 2,759,281 | A | 8/1956 | Akers, Jr. |
| 3,251,543 | A | 5/1966 | Bush |
| 3,710,108 | A | 1/1973 | Haarhaus et al. |
| 3,836,755 | A | 9/1974 | Ehrat et al. |

(Continued)

FOREIGN PATENT DOCUMENTS

CA 1300235 5/1992

(Continued)

OTHER PUBLICATIONS

Henderson, L., "Handle with Care; Automation Is Key to Distributing Goods on Time," Midrange Systems, vol. 6, No. 16, p. 19, Aug. 24, 1993.*

(Continued)

*Primary Examiner* — Nicholas D Rosen
(74) *Attorney, Agent, or Firm* — Osha • Liang LLP

(57) ABSTRACT

Systems, methods, and computer-readable mediums provide for storing location information of a plurality of products, receiving information from a remote electronic device, wherein the received information includes information relating to a position of the remote electronic device and identifying information of one of the plurality of products, and updating the location information of the one of the plurality of products with the position of the remote electronic device. Alternatively, systems, methods, and computer-readable mediums provide for obtaining location information of a plurality of products at an electronic device and position information of the electronic device, and transmitting the obtained location information of the one of the plurality of products and the position of the electronic device to a remote computing device, wherein the location information of the one of the plurality of products is updated at the remote computing device with the position of the electronic device.

9 Claims, 14 Drawing Sheets

U.S. PATENT DOCUMENTS

| | | |
|---|---|---|
| 4,071,740 A | 1/1978 | Gogulski |
| 4,139,149 A | 2/1979 | Crepeau et al. |
| 4,334,278 A | 6/1982 | Marmon |
| 4,373,133 A | 2/1983 | Clyne et al. |
| 4,500,880 A | 2/1985 | Gomersall et al. |
| 4,528,638 A | 7/1985 | Hatta et al. |
| 4,703,423 A | 10/1987 | Bado et al. |
| 4,750,151 A | 6/1988 | Baus |
| 4,882,724 A | 11/1989 | Vela et al. |
| D307,895 S | 5/1990 | Kitagawa et al. |
| 4,973,952 A | 11/1990 | Malec et al. |
| 4,988,025 A | 1/1991 | Lipton et al. |
| 4,996,642 A | 2/1991 | Hey |
| 5,047,614 A | 9/1991 | Blanco |
| 5,149,947 A | 9/1992 | Collins, Jr. |
| 5,158,310 A | 10/1992 | Tannehill et al. |
| 5,250,789 A | 10/1993 | Johnsen |
| D341,691 S | 11/1993 | Begum et al. |
| 5,264,822 A | 11/1993 | Vogelman et al. |
| 5,287,266 A | 2/1994 | Malec et al. |
| 5,294,781 A | 3/1994 | Takahashi et al. |
| 5,295,064 A | 3/1994 | Malec et al. |
| D346,366 S | 4/1994 | Kim et al. |
| 5,301,443 A | 4/1994 | Gori |
| D347,505 S | 5/1994 | Machen et al. |
| D347,719 S | 6/1994 | Machen et al. |
| D354,485 S | 1/1995 | Maeno et al. |
| 5,406,271 A | 4/1995 | Sonnendorfer et al. |
| 5,420,606 A | 5/1995 | Begum et al. |
| 5,424,524 A | 6/1995 | Ruppert et al. |
| 5,457,307 A | 10/1995 | Dumont |
| 5,483,472 A | 1/1996 | Overman |
| 5,544,040 A | 8/1996 | Gerbaulet |
| D375,601 S | 11/1996 | Myers et al. |
| 5,572,653 A | 11/1996 | DeTemple et al. |
| D376,459 S | 12/1996 | Myers |
| 5,583,763 A | 12/1996 | Atcheson et al. |
| 5,630,068 A | 5/1997 | Vela et al. |
| 5,630,071 A | 5/1997 | Sakai et al. |
| 5,664,948 A | 9/1997 | Dimitriadis et al. |
| 5,703,564 A | 12/1997 | Begum et al. |
| D390,861 S | 2/1998 | Liao et al. |
| 5,714,745 A | 2/1998 | Ju et al. |
| D392,259 S | 3/1998 | Simmon |
| 5,729,697 A | 3/1998 | Schkolnick et al. |
| 5,739,513 A | 4/1998 | Watanabe |
| 5,749,081 A | 5/1998 | Whiteis |
| 5,773,954 A | 6/1998 | VanHorn |
| 5,804,803 A | 9/1998 | Cragun et al. |
| 5,821,512 A | 10/1998 | O'Hagan et al. |
| 5,821,513 A | 10/1998 | O'Hagan et al. |
| 5,823,513 A | 10/1998 | Stenquist et al. |
| 5,836,051 A | 11/1998 | Myers et al. |
| 5,841,115 A | 11/1998 | Shepley |
| D404,761 S | 1/1999 | Tarpenning et al. |
| 5,859,414 A | 1/1999 | Grimes et al. |
| 5,884,282 A | 3/1999 | Robinson |
| 5,890,135 A | 3/1999 | Powell |
| 5,898,158 A | 4/1999 | Shimizu et al. |
| 5,918,211 A | 6/1999 | Sloane |
| 5,963,948 A | 10/1999 | Shilcrat |
| 5,971,277 A | 10/1999 | Cragun et al. |
| 5,978,766 A | 11/1999 | Luciw |
| 5,979,757 A | 11/1999 | Tracy et al. |
| 5,984,182 A | 11/1999 | Murrah et al. |
| 5,995,015 A | 11/1999 | DeTemple et al. |
| 6,000,610 A | 12/1999 | Talbott et al. |
| 6,012,051 A | 1/2000 | Sammon, Jr. et al. |
| 6,012,244 A | 1/2000 | Begum et al. |
| 6,032,127 A | 2/2000 | Schkolnick et al. |
| 6,105,867 A | 8/2000 | Shimizu et al. |
| 6,112,857 A | 9/2000 | Morrison |
| 6,119,935 A | 9/2000 | Jelen et al. |
| 6,123,259 A | 9/2000 | Ogasawara |
| 6,129,274 A | 10/2000 | Suzuki |
| 6,129,276 A | 10/2000 | Jelen et al. |
| 6,168,079 B1 | 1/2001 | Becker et al. |
| 6,177,880 B1 | 1/2001 | Begum |
| 6,189,788 B1 | 2/2001 | Sherman et al. |
| D438,849 S | 3/2001 | Adachi et al. |
| 6,199,753 B1 | 3/2001 | Tracy et al. |
| 6,236,330 B1 | 5/2001 | Cohen |
| 6,256,334 B1 | 7/2001 | Adachi et al. |
| 6,259,381 B1 | 7/2001 | Small |
| 6,317,722 B1 | 11/2001 | Jacobi et al. |
| 6,323,753 B2 | 11/2001 | Begum |
| 6,327,570 B1 | 12/2001 | Stevens |
| D454,563 S | 3/2002 | Brown et al. |
| 6,356,879 B2 | 3/2002 | Aggarwal et al. |
| 6,370,513 B1 | 4/2002 | Kolawa et al. |
| 6,386,450 B1 | 5/2002 | Ogasawara |
| D460,759 S | 7/2002 | West et al. |
| 6,434,530 B1 | 8/2002 | Sloane et al. |
| 6,435,407 B1 | 8/2002 | Fiordelisi |
| 6,453,588 B1 | 9/2002 | Lykens |
| 6,456,981 B1 | 9/2002 | Dejaeger et al. |
| D464,646 S | 10/2002 | Lin |
| 6,484,939 B1 | 11/2002 | Blaeuer |
| 6,502,076 B1 | 12/2002 | Smith |
| 6,502,124 B1 | 12/2002 | Shimakawa et al. |
| 6,507,279 B2 | 1/2003 | Loof |
| 6,513,015 B2 | 1/2003 | Ogasawara |
| 6,533,173 B2 | 3/2003 | Benyak |
| 6,539,417 B2 | 3/2003 | Stern |
| 6,550,674 B1* | 4/2003 | Neumark ...................... 235/383 |
| 6,587,835 B1 | 7/2003 | Treyz et al. |
| 6,591,247 B2 | 7/2003 | Stern |
| 6,595,417 B2 | 7/2003 | O'Hagan et al. |
| 6,619,546 B1 | 9/2003 | Nguyen et al. |
| D480,760 S | 10/2003 | Wieth et al. |
| D481,057 S | 10/2003 | Brady et al. |
| D482,172 S | 11/2003 | Johnson et al. |
| D483,361 S | 12/2003 | Yao et al. |
| 6,659,344 B2 | 12/2003 | Otto et al. |
| 6,659,346 B1 | 12/2003 | Williams |
| 6,725,206 B1 | 4/2004 | Coveley |
| 6,732,120 B1 | 5/2004 | Du et al. |
| 6,741,975 B1 | 5/2004 | Nakisa et al. |
| D492,303 S | 6/2004 | Schlieffers et al. |
| D494,970 S | 8/2004 | Chen et al. |
| D495,703 S | 9/2004 | Ma et al. |
| 6,813,608 B1 | 11/2004 | Baranowski |
| 6,820,062 B1 | 11/2004 | Gupta et al. |
| 6,837,436 B2 | 1/2005 | Swartz et al. |
| 6,845,656 B2 | 1/2005 | Matsumura et al. |
| 6,850,923 B1 | 2/2005 | Nakisa et al. |
| 6,854,656 B2 | 2/2005 | Matsumori et al. |
| 6,869,013 B2 | 3/2005 | Allen et al. |
| 6,873,967 B1 | 3/2005 | Kalagnanam et al. |
| 6,910,697 B2 | 6/2005 | Varatharajah et al. |
| 6,912,398 B1 | 6/2005 | Domnitz |
| 6,912,507 B1 | 6/2005 | Phillips et al. |
| 6,915,135 B1 | 7/2005 | McKee et al. |
| 6,928,343 B2 | 8/2005 | Cato |
| D509,827 S | 9/2005 | Johnson |
| D510,784 S | 10/2005 | Van Landingham, Jr. |
| D511,547 S | 11/2005 | Andersson et al. |
| 7,044,373 B1* | 5/2006 | Garber et al. .................. 235/385 |
| 7,493,336 B2* | 2/2009 | Noonan ...................... 707/104.1 |
| 2001/0007450 A1 | 7/2001 | Begum |
| 2001/0028301 A1 | 10/2001 | Geiger et al. |
| 2002/0003166 A1 | 1/2002 | Miller et al. |
| 2002/0008621 A1* | 1/2002 | Barritz et al. .............. 340/572.1 |
| 2002/0038267 A1* | 3/2002 | Can et al. .......................... 705/28 |
| 2002/0065714 A1 | 5/2002 | Goodwin, III |
| 2002/0147597 A1* | 10/2002 | Connors et al. .................... 705/1 |
| 2002/0147642 A1 | 10/2002 | Avallone et al. |
| 2002/0165778 A1 | 11/2002 | O'Hagan et al. |
| 2002/0174021 A1 | 11/2002 | Chu et al. |
| 2002/0178013 A1 | 11/2002 | Hoffman et al. |
| 2002/0194604 A1 | 12/2002 | Sanchez et al. |
| 2003/0004831 A1 | 1/2003 | Owens |
| 2003/0050995 A1 | 3/2003 | Mateos |
| 2003/0105667 A1 | 6/2003 | Millikan |
| 2003/0106022 A1 | 6/2003 | Goodacre et al. |
| 2003/0130909 A1 | 7/2003 | Caci et al. |
| 2003/0131215 A1 | 7/2003 | Bellew |

| | | | |
|---|---|---|---|
| 2003/0132298 | A1 | 7/2003 | Swartz et al. |
| 2004/0073489 | A1 | 4/2004 | Varatharajah et al. |
| 2004/0073572 | A1 | 4/2004 | Jiang |
| 2004/0093274 | A1 | 5/2004 | Vanska et al. |
| 2004/0103031 | A1 | 5/2004 | Weinschenk |
| 2004/0128210 | A1 | 7/2004 | Gabos et al. |
| 2004/0215530 | A1 | 10/2004 | Rawson et al. |
| 2005/0021561 | A1* | 1/2005 | Noonan ............... 707/104.1 |
| 2005/0040230 | A1 | 2/2005 | Swartz et al. |

FOREIGN PATENT DOCUMENTS

| | | |
|---|---|---|
| EP | 0870264 | 10/1998 |
| EP | 1501034 | 1/2005 |
| EP | 1519283 | 3/2005 |
| GB | 2307575 A | 5/1997 |
| JP | 2000-155683 | 6/2000 |
| WO | WO-96/11130 | 4/1996 |
| WO | WO-97/29452 A1 | 8/1997 |
| WO | WO-0067176 | 11/2000 |
| WO | WO-01/82140 | 11/2001 |
| WO | WO-02/03224 | 1/2002 |
| WO | WO-02/06983 | 1/2002 |
| WO | WO-0248991 | 6/2002 |
| WO | WO-02082210 A1 | 10/2002 |
| WO | WO-02082210 A2 * | 10/2002 |
| WO | WO-03042775 | 5/2003 |
| WO | WO-2004/053632 | 6/2004 |
| WO | WO-2004090803 | 10/2004 |
| WO | WO-2006/031657 | 3/2006 |

OTHER PUBLICATIONS

Cuesol; "Enhancing the Customer Experience"; www.cuesol.com; 2005.

Klever Marketing; "Emarketing's Billion-Dollar Opportunity"; www.kleverkart.com; 2005; and Fujitsu; "The Fujitsu Difference—U-Scan Shopper"; www.fujitsu.com; 2005.

Wincor Nixdorf; "SNIKEY"; www.wincor-nixdorf.com; Apr. 7, 2005.

Wincor Nixdorf; "POS Terminal Beetle/IPOS"; www.wincor-nixdorf.com; Oct. 15, 2004.

Wincor Nixdorf; "Beetle/NETPOS Scalable Thin Client Terminal"; www.wincor-nixdorf.com; Apr. 15, 2004.

Interactive Store Guide and item Locator for Deli Kiosk, www.dumac.com.

Intermedia kiosks—news—Supermarket News, (Apr. 2001).

Metro Group Future Store Initiative, Personal Shopping Assisstant, www.future-store.org.

IBM, "Stop & Shop grocery drivers sales and boosts customer loyalty with IBM Personal Shopping Assistant", On Demand Business ™, 2004 [retrieved on Sep. 26, 2006], http://www-03.ibm.com/products/retail/files/G107-0380-61.pdf.

Kourouthanassis, P. et al., "Developing Consumer-Friendly Pervasive Retail Systems", IEEE Pervasive Computing; vol. 2, No. 2, Apr.-Jun. 2003, pp. 32-39.

Examination Report dated Oct. 28, 2010, corresponding to Chinese Patent Application No. 200680023600.3. (12 pages).

* cited by examiner

COMPANY INFORMATION

| COMPANY ID | DATE CREATED | NAME | STREET | CITY |
|---|---|---|---|---|
| 1 | MONDAY, AUGUST 23, 2004 | ACME RETAILER | 5931 SEA LION PLACE, SUITE 109 | CARLSBAD |
| 2 | FRIDAY, DECEMBER 09, 2005 | BIG BOX RETAILER | 207 QUEEN'S QUAY W., SUITE 320 | TORONTO |
| 3 | TUESDAY, MARCH 14, 2006 | LITTLE BOX RETAILER | 4 BARNABY PRIVATE | OTTAWA |

LOCATION INFORMATION

| COMPANY ID | HIERARCHY ID | MEMBER ID | TIMEZONE ID | DATE CREATED |
|---|---|---|---|---|
| 1 | 1 | 1001 | 1 | MONDAY, AUGUST 23, 2004 |
| 1 | 1 | 1002 | 2 | MONDAY, AUGUST 23, 2004 |
| 1 | 1 | 1003 | 3 | MONDAY, AUGUST 23, 2004 |
| 1 | 1 | 10001 | 0 | MONDAY, AUGUST 23, 2004 |
| 1 | 1 | 10002 | 0 | MONDAY, AUGUST 23, 2004 |
| 1 | 1 | 1000000 | 0 | MONDAY, AUGUST 23, 2004 |

LEVEL INFORMATION

| COMPANY ID | HIERARCHY ID | LEVEL ID | DATE CREATED | LEVEL NAME |
|---|---|---|---|---|
| 1 | 1 | 1000 | MONDAY, AUGUST 23, 2004 | LOCATION |
| 1 | 1 | 10000 | MONDAY, AUGUST 23, 2004 | ZONE |
| 1 | 1 | 1000000 | MONDAY, AUGUST 23, 2004 | NATIONAL |

HIERARCHY INFORMATION

| COMPANY ID | HIERARCHY ID | DATE CREATED | HIERARCHY NAME |
|---|---|---|---|
| 1 | 1 | MONDAY, AUGUST 23, 2004 | STANDARD HIERARCHY |

GROUPING DETAILS

| COMPANY ID | HIERARCHY ID | GROUP ID | DATE CREATED | MEMBER ID |
|---|---|---|---|---|
| 1 | 1 | 10001 | MONDAY, AUGUST 23, 2004 | 1001 |
| 1 | 1 | 10001 | MONDAY, AUGUST 23, 2004 | 1002 |
| 1 | 1 | 10002 | MONDAY, AUGUST 23, 2004 | 1003 |
| 1 | 1 | 1000000 | MONDAY, AUGUST 23, 2004 | 10001 |
| 1 | 1 | 1000000 | MONDAY, AUGUST 23, 2004 | 10002 |

FIG. 4B

| COMPANY INFORMATION (CONT.) | | | | |
|---|---|---|---|---|
| STATE | ZIP CODE | COUNTRY | PHONE NUMBER | FAX NUMBER |
| CA | 92010 | USA | (999) 999-9999 | (999) 999-9999 |
| ON | M5J 1A7 | CANADA | (999) 999-9999 | (999) 999-9999 |
| ON | K1K 4S4 | CANADA | (999) 999-9999 | (999) 999-9999 |

| LOCATION INFORMATION (CONT.) | | | | | | | | |
|---|---|---|---|---|---|---|---|---|
| MEMBER NAME | LEVEL ID | STREET | CITY | STATE | ZIP CODE | COUNTRY | PHONE NUMBER | FAX NUMBER |
| STORE-SAN JOSE CALIFORNIA | 1000 | 1233 BIRCH STREET | SAN JOSE | CA | 920113 | USA | (999) 999-9999 | (999) 999-9999 |
| STORE-OAKLAND CALIFORNIA | 1000 | 111 MAIN STREET | OAKLAND | CA | 92012 | USA | (999) 999-9999 | (999) 999-9999 |
| STORE-SAN DIEGO CALIFORNIA | 1000 | 123 LOWE AVENUE | SAN DIEGO | CA | 92011 | USA | (999) 999-9999 | (999) 999-9999 |
| ZONE-CALIFORNIA NORTH | 10000 | UNKNOWN | UNKNOWN | CA | 0 | USA | (999) 999-9999 | (999) 999-9999 |
| ZONE-CALIFORNIA SOUTH | 10000 | UNKNOWN | UNKNOWN | CA | 0 | USA | (999) 999-9999 | (999) 999-9999 |
| NATIONAL-ACME RETAILER | 1000000 | 5931 SEA LION PLACE, SUITE 109 | CARLSBAD | CA | 92010 | USA | (999) 999-9999 | (999) 999-9999 |

FIG.4C

TABLE A

| ZONE | MIN COORDINATE | MAX COORDINATE | LOCATION ID |
|---|---|---|---|
| 1 | | | |
| 2 | | | |
| 3 | | | |
| 4 | | | |
| . | | | |
| . | | | |
| N | | | |

TABLE B  ZONE 1

| SKU # | ZONE ID | PRODUCT ID | ACTIVE/INACTIVE | LOCATION ID |
|---|---|---|---|---|
| | | | | |
| | | | | |

FIG.6

FIG.7D

SYSTEMS AND METHODS FOR ENABLING INFORMATION MANAGEMENT INCORPORATING A PERSONAL COMPUTING DEVICE

RELATED APPLICATION DATA

This application is related to and claims priority to U.S. Provisional Application No. 60/675,843, filed Apr. 29, 2005, entitled "Systems and Methods for Enabling Information Management Incorporating a Personal Computing Device", which is expressly incorporated herein by reference in its entirety.

BACKGROUND OF THE INVENTION

1. Field of the Invention

The present invention relates generally to a system including a personal computing device, and more specifically, to systems and methods for enabling information management incorporating a personal computing device.

2. Description of Related Art

Retailers are providing larger retail shopping establishments that provide an increasing amount of services to the customer. However, as the number of services increase, and as the number of customers increase, it becomes increasingly difficult to provide sufficient customer service. Further it becomes increasing difficult to manage customer information and provide customers with information relevant to their shopping experience. Conventional personal computing devices fail to address this need for a single source of information for a customer.

As such, what is needed is a personal computing device that operates within a system that is capable of managing customer information efficiently and provides information to the customer efficiently.

SUMMARY OF THE INVENTION

Systems, methods, and computer-readable mediums, consistent with principles of some embodiments of the present invention provide for storing location information of a plurality of products, receiving information from a remote electronic device, wherein the received information includes information relating to a position of the remote electronic device and identifying information of one of the plurality of products, and updating the location information of the one of the plurality of products with the position of the remote electronic device.

Alternatively, systems, methods, and computer-readable mediums, consistent with principles of some embodiments of the present invention provide for obtaining location information of a plurality of products at an electronic device and position information of the electronic device, and transmitting the obtained location information of the one of the plurality of products and the position of the electronic device to a remote computing device, wherein the location information of the one of the plurality of products is updated at the remote computing device with the position of the electronic device.

BRIEF DESCRIPTION OF THE DRAWINGS

The accompanying drawings, which are incorporated in and constitute a part of this specification, illustrate several embodiments of the invention and together with the description, serve to explain the principles of the invention, and, together with the description, explain the features and aspects of the invention. In the drawings.

FIGS. 4B-4C depict some exemplary data tables consistent with the principles of some embodiments of the present invention;

FIG. 6 depicts an exemplary tables stored in memory consistent with the principles of some embodiments of the present invention; and FIGS. 7A-7D depicts exemplary images presented to a consumer utilizing a personal shopping device, consistent with the principles of some embodiments of the present invention.

DETAILED DESCRIPTION

Reference will now be made in detail to the present invention, examples of which are illustrated in the accompanying drawings. Wherever possible, the same reference numbers will be used throughout the drawings to refer to the same or like parts.

Overview

Methods and systems consistent with the principles of some embodiments of the present invention enhance a consumer's personal shopping experience by providing a personal shopping device to a consumer in a retail shopping environment and enabling the consumer, utilizing a consumer interface, to access information. Further systems and methods consistent with principles of some embodiments of the present invention enable a user, through an application server, to manage information delivered to the personal shopping device. Further systems and methods consistent with principles of some embodiments of the present invention enable a retailer to manage inventory, location of products within a shopping establishment and/or study and maximize product layouts in order to maximize sales. Further systems and methods consistent with principles of some embodiments of the present invention provide a user with a loyalty card, personal key fob, etc. that interacts with the personal shopping device to customize the shopping experience. Further systems and methods consistent with principles of some embodiments of the present invention provide for the efficient exchange of content between a personal shopping device and an application server. Further methods and systems consistent with principles of some embodiments of the present invention enable manufacturers to schedule and send information to the personal shopping device. Further methods and systems consistent with principles of some embodiments of the present invention enable customers to place orders for counter services. Further methods and systems consistent with principles of some embodiments of the present invention enable efficient management of company information, shopping establishment information and customer information within the system. Further methods and systems consistent with principles of some embodiments of the present invention enable a customer to generate and maintain a list of products for purchase.

It may be appreciated by one of ordinary skill in the art, that the systems and methods discussed herein may be implemented in a variety of shopping environments. For exemplary purposes, systems and methods consistent with principles of the present invention will be discussed herein in a retail grocery shopping environment. The terms personal shopping device and personal computing device are used interchangeably herein.

System Architecture

Figure 1:
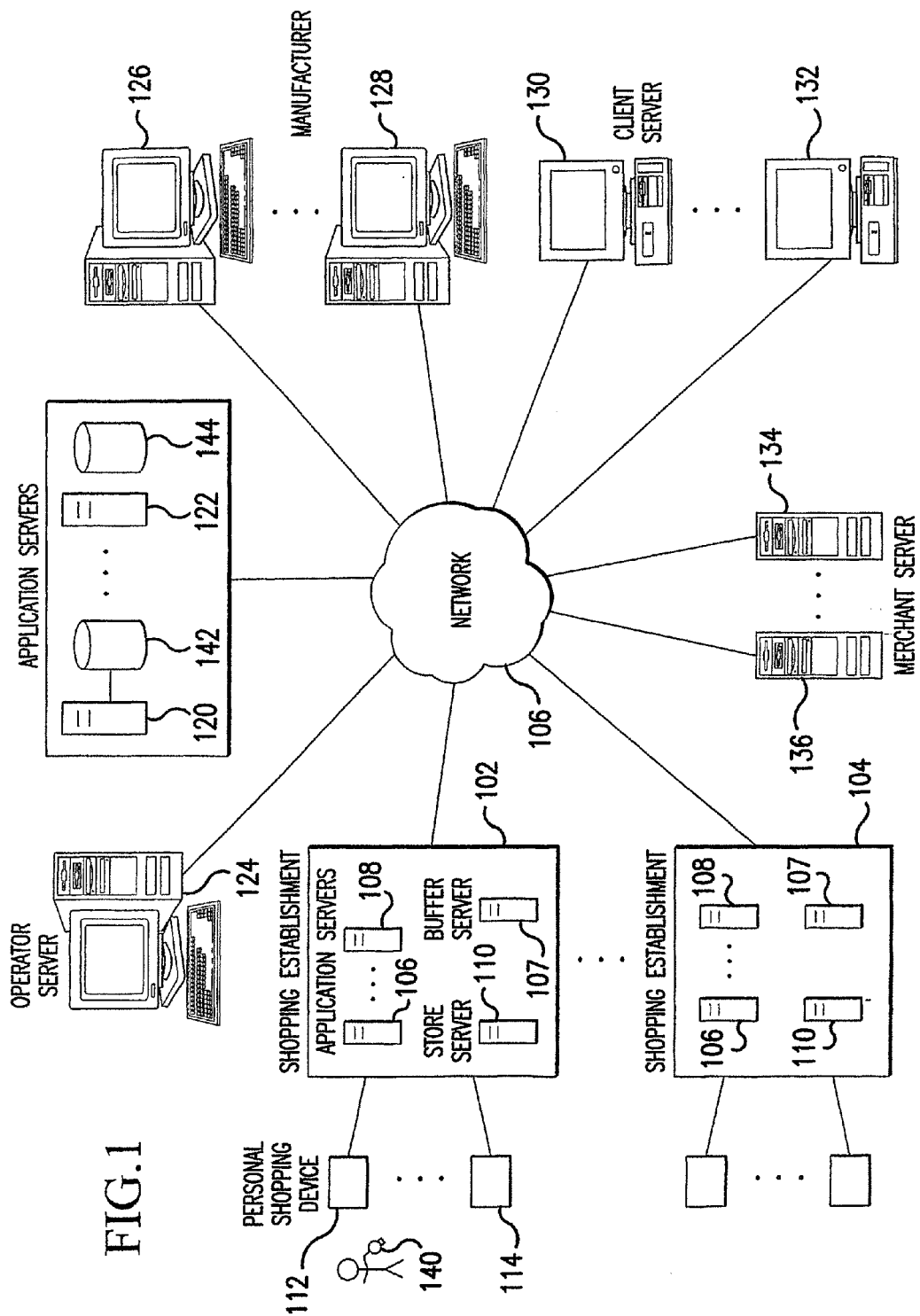
FIG. 1 is an exemplary diagram of a system environment in which systems and methods, consistent with the principles of some embodiments of the present invention, may be implemented.

FIG. 1 is an exemplary diagram of a system environment 100 for implementing the principles of the present invention. The components of system 100 may be implemented through any suitable combinations of hardware, software, and/or firmware. As shown in FIG. 1, system 100 includes a plurality of stores 102, 104. Store 102 includes store server 110 that is maintained by the grocery store. Store 102 further includes a plurality of servers 106, 108 that may interact with a plurality of application servers 120, 122 through network 116. Alternatively, servers 106, 108 may be implemented as one server. Store 102 may further include a buffer server 107 that is communicably linked to both store server 110 and one or both of application servers 106, 108. Buffer server 107 may store information that may be shared between application server 106, 108 and store server 110. The buffer server 107 may serve to protect information stored at the respective servers, so that all information stores at the respective servers may be secure. Alternatively, one of both of application servers 106, 108 may be communicably linked to store server 110. A plurality of personal shopping devices 112, 114 physically located within or near store 102 may interact with servers 106, 108, using known technology, including wireless communication. A consumer may access the personal shopping device 112 to access and manage information to enhance their shopping experience. Each personal shopping device 112, 114 may be associated with a unique identifier. The consumer may access the personal shopping device 112 with a personalized key fob 140.

System 100 may further include operator server 124 wherein a user at server 124 may manage information that is provided to application servers 120, 122, servers 106, 108 and/or personal shopping device 112, 114 through network 116. Manufacturer 126, 128 may further reside on within system 100 wherein manufacturer 126, 128 may access application servers 120, 122 to request and/or schedule information related to their products to be downloaded to personal shopping device 112, 114.

System 100 may further include client computers 130, 132, which may be communicably linked to application servers 120, 122, wherein a consumer may enter information for access by the personal shopping device 112, 114. For example, the consumer may access application servers 120, 122 and enter information, i.e., a shopping list, for access at the grocery store by the personal shopping device 112, 114. Finally, system 100 may include merchant servers 136, 134. Merchant servers 134, 136 may be accessed by application servers 120, 122 and/or personal shopping devices 112, 114 to obtain content for viewing by the consumer at the personal shopping device 112, 114.

It may be appreciated by one of ordinary skill in the art that while only one or two devices, client computers, and/or servers may be depicted, that many devices, client computers, and/or servers may reside within system 100. While network 116 may be implemented as the Internet, network 116 may be any local or wide area network, either public or private.

Figure 2:
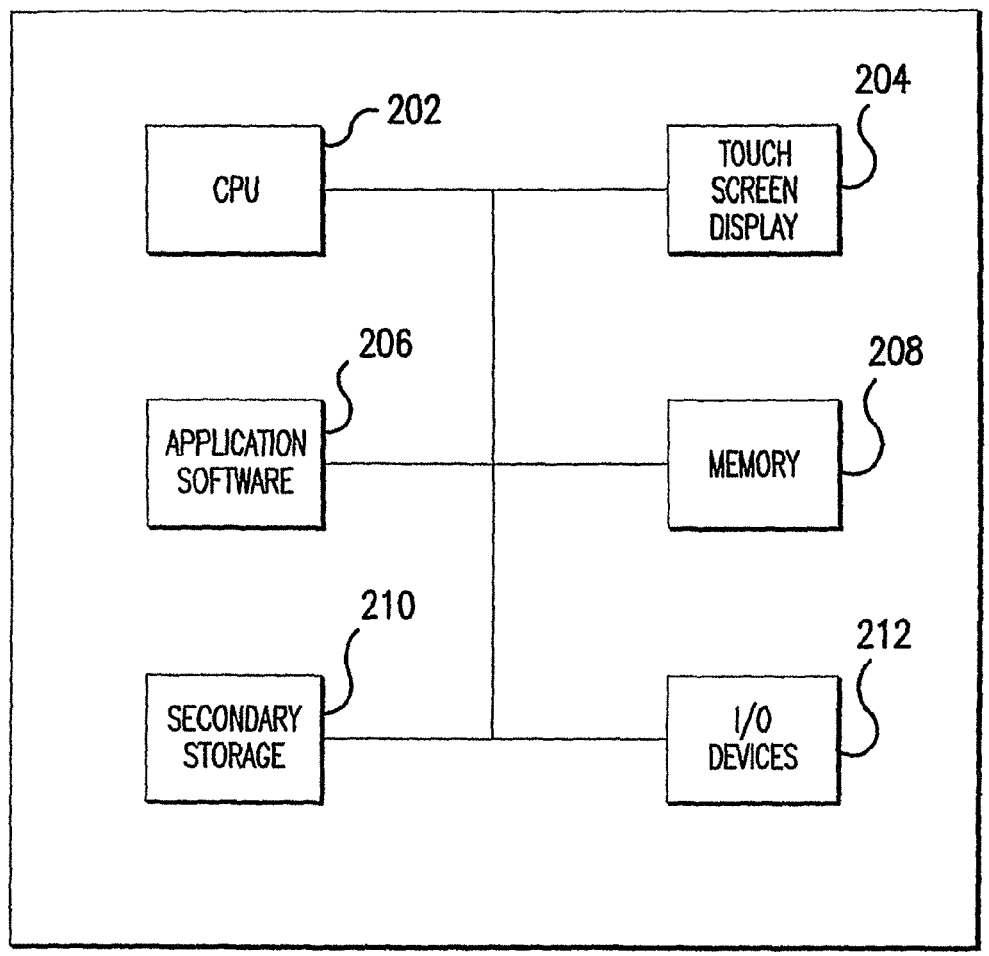
FIG. 2 is an exemplary diagram of main components of a personal shopping device, consistent with some embodiments of the principles of the present invention.
Figure 2A:
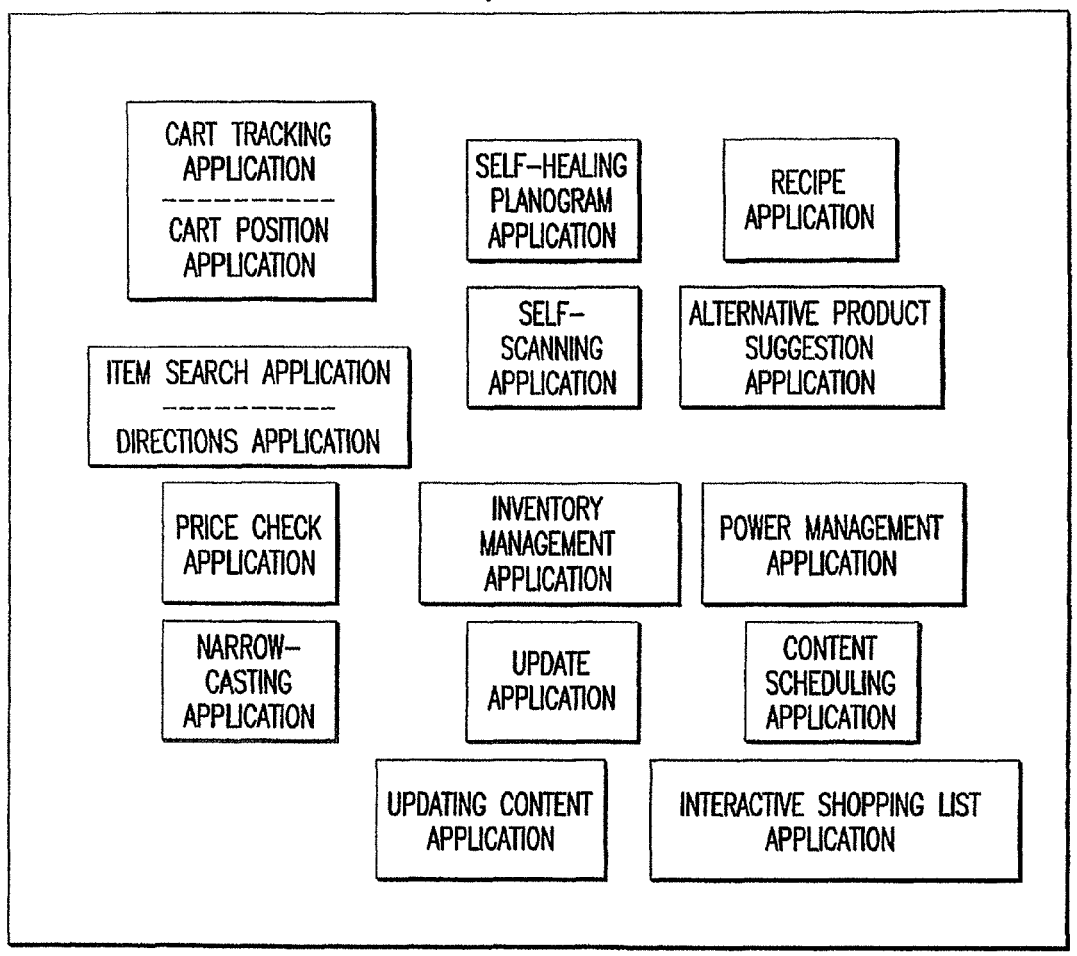
FIG. 2A is an exemplary diagram of the application components of a personal shopping device consistent with some embodiments of the present invention.

FIG. 2 depicts an exemplary block diagram of components included in personal shopping device 112, 114. Personal shopping device 112, 114 may be implemented as a computing device that may be made a part of a shopping cart. Personal shopping device 112, 114 may include central processing unit 202, a touch display screen 204, application software 206, memory 208, secondary storage 210, and input/output devices 212. Personal shopping device 112, 114 may be communicably linked to servers 106, 108. Further, personal shopping device 112, 114 may be communicably linked to merchant server 134, 136 through servers 106, 108.

A customer may access network 116 through sever 106, 108 using application software 206 wherein the application software may include a conventional browser including conventional browser applications available from Microsoft or Netscape. Application software 206 may further include a user interface that enhances a consumer's shopping experience by providing a plurality of features as discussed herein.

Input/output devices 212 may include, for example, a bar code reader, a USB port for receiving key fob 140, an interface to receive a variety of external devices, including, but not limited to, a smart card, a floppy disk, an external memory device, i.e., compact flash card, memory stick, etc., and a touch screen display for displaying information to the consumer and receiving information from the customer through input at the touch screen, etc.

Figure 3:
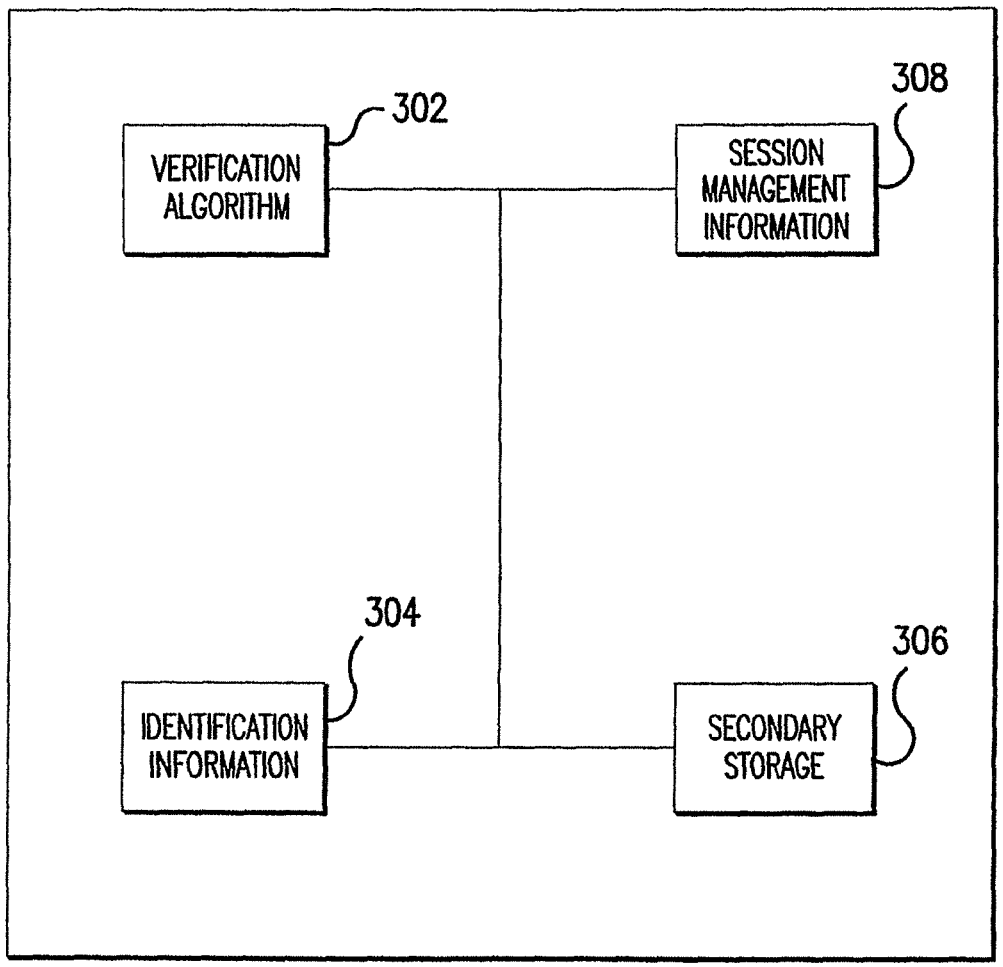
FIG. 3 is an exemplary diagram of components of a key fob, consistent with the principles of some embodiments of the present invention.

FIG. 3 depicts an exemplary block diagram of the components that may reside on key fob 140 consistent with principles of some embodiments of the present invention. As depicted in FIG. 3, identification information may be stored. Upon issuance of the key fob 140 to the consumer, the system associates unique identification information 304 with the consumer. This unique identification information 304 identifying the consumer may be stored on key fob 140. Upon insertion of the key fob 140 into personal shopping device 112, 114, a verification algorithm 302, stored on key fob 140 may be performed to verify the authenticity of key fob 140. Upon proper verification, the consumer may access the information available at the personal shopping device 112, 114. Further, a session may be created and managed utilizing session management information 308, stored at key fob 140. As such, in the event of a personal shopping device failure, as the device stores all interaction between the customer and the personal shopping device, the consumer's session may be fully restored using the information stored at session management information 308.

Figure 4:
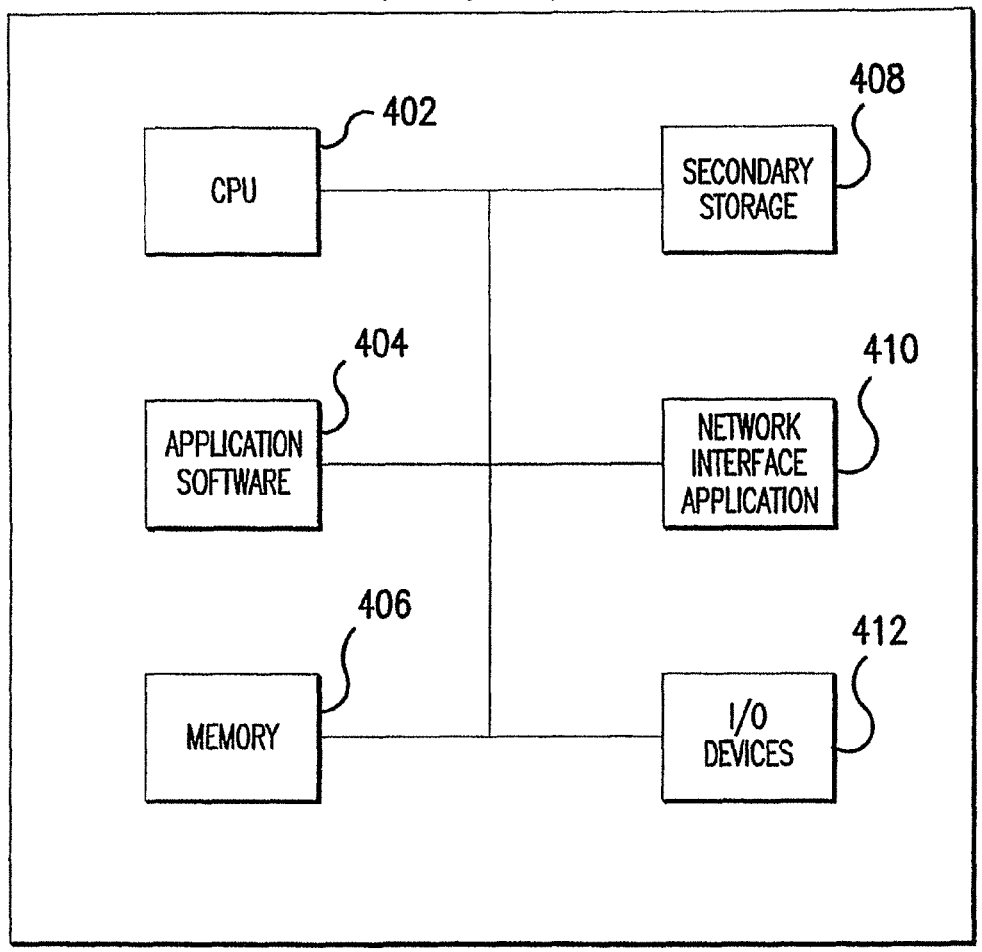
FIG. 4 depicts an exemplary diagram of the main components of an application server, consistent with the principles of some embodiments of the present invention.

FIG. 4 depicts an exemplary diagram of application servers 106, 108, 120, 122 that may be implemented in system environment 100, consistent with the principles of some embodiments of the present invention. As shown in FIG. 4, application servers 106, 108, 120, 122 include a CPU 402, application software 404, memory 406, secondary storage 408, network interface application 410, and input/output devices 412. Input/output devices 212 may include, for example, a keyboard, a mouse, a video cam, a display, a storage device, a printer, etc. Application software 404 may include software applications that facilitate the scheduling and sending of smart content as discussed herein to personal shopping devices 112, 114. Application software 404 may further include software applications that facilitate the tracking of personal shopping devices within and around the retail shopping environment, and, based upon the tracking information, facilitate determining certain information as discussed herein. Application software 404 may further facilitate the functionality in accordance with the personal shopping devices 112, 114 discussed herein. It may be appreciated that the configuration of operator server 124, manufacture server 126, 128, client computer 130, 132 and merchant server 134, 136 may be similarly configured to the application servers as depicted in FIG. 4 wherein the application software may differ in accordance with the functionality of the individual computers as discussed herein.

Personal Shopping Device Tracking Application

Using conventional applications, the system may track the present location of each of the plurality of personal shopping devices located in or near the shopping environment. In addition to tracking each of the plurality of personal shopping devices, for each personal shopping device, the system may store the position of the personal shopping device at predetermined intervals, i.e., every five seconds. This information may then be used to determine the actual location of the personal shopping device with respect to certain products, either part of or the total path of the personal shopping device as it travels through the shopping environment, etc. This information may be used for several purposes.

First, using this information, the system may determine where, within the shopping environment, the personal shopping device is located. Certain flags or conditions may be set within the system such that upon the determination of a personal shopping device being within a certain distance of a particular location, directed advertising may be employed. This directed advertising may or may not take into consideration the consumer's shopping history. The user, at operating server 124 or at application servers 120, 122, may create and modify these flags or conditions thus establishing an event-driving process. For example, if it is determined, based upon the location of the personal shopping device, the consumer is located in the juice section, a computer-generated discount may be offered to the consumer. These computer-generated discounts may be offered to some or all of the consumers when they are within a predetermined location of the juice section. Alternatively, if it is determined that the consumer has spent $20 in juice in the past 2 weeks, based upon a consumer's stored shopping history, a computer-generated discount may be offered to the consumer based upon the consumer's shopping history. These computer-generated discounts may be offered by displaying the discount to the consumer on the display of the personal shopping device 112, 114. Similarly, advertising, surveys, etc., may selectively be displayed to the consumer based upon personal shopping device location and/or the consumer's shopping history.

Second, using the set of determined positions obtained using the personal shopping device location application, a part of or the total path of the personal shopping device through the shopping establishment may be determined. This may be useful to identify how frequently each aisle, area, zone, etc., of the store is visited. By identifying which areas of the shopping establishment are most frequently visited, the shopping establishment owner may optimize this space by placing certain products within the area that the shopping establishment owner would like to sell quickly, heavily advertise, place special deals, etc. Further, by identifying those areas of the store that are least frequently visited, the shopping establishment owner may re-arrange the products within the store to generate more traffic in those less-traveled areas.

Further, it may provide information indicating that the layout of the shopping establishment is confusing to the consumer; not laid out properly, etc.

Third, the system may store information relating to the date, duration, etc. of a customer's shopping experience. Using the information obtained, the shopping establishment owner may be able to compare the speed of shopping at one store with the speed of shopping at another store.

Fourth, the personal shopping device position information may be used to support the self-healing planogram discussed below.

Content Scheduling Application

A user may schedule content to be downloaded and displayed to a consumer at the personal shopping device using an application at operator server 124, and/or application servers 120, 122. Alternatively, a user at application servers 106, 108 or buffer server 107 may schedule content to be downloaded and displayed at the personal shopping device. Using the content scheduling application, a user may enter the content to be displayed, the start and end date/time, which shopping establishments and/or personal shopping devices the content should be downloaded to (either by designating the individual personal shopping devices, or the individual consumers), the commands to be performed by the personal shopping device before and/or after the content is to be displayed, etc. This content may be directed, active, and/or passive advertising and may be in the form of text, images, etc., commands to be performed by the CPU of the personal shopping device, updates for software applications, etc.

Alternatively, the manufacturer, using a similar content scheduling application, may access application server 120, 122 to request scheduling of content by inputting similar information. This request may be reviewed prior to the scheduling of the content, or may be automatically scheduled.

Alternatively, the content may simply be stored either at application server 106, 108, buffer server 107, or personal shopping device 112, 114 where the content is pushed to the personal shopping device and played in a list order, randomly, etc.

Personal Shopping Device Update Application

Information may be updated at the personal shopping device when the personal shopping device is recharging. A determination may be made to ensure sufficient power remains at the personal shopping device for the duration of the download and installation, if the personal shopping device is not plugged in. For example, upon a determination that the personal shopping device is not recharging, and that a predetermined power level is maintained, the personal shopping device may generate a message to application server 106, 108, advising the application server 106, 108 that the personal shopping device is ready to download content. Upon receipt of the message, application server 106. 108, prepares a response to the personal shopping device providing the personal shopping device with a public key and advises the personal shopping device that updates are ready for downloading. Using the updating content application, the personal shopping device retrieves a private key from its storage and submits a request with the private key for updated content data. This ensures that only the proper personal shopping devices may download content from application server 106, 108. Upon receipt of the request, application server 106, 108 transmits the updated content to the personal shopping device.

This exchange of transmissions between the personal shopping device and application server 106, 108, may be facilitated with Microsoft's Message Queuing Center (MSMQ) wherein the header of the messages are modified to include security information, i.e., an RSA key, to ensure secure transactions.

It may be appreciated by one skilled in the art that the power level determination may not be performed if the personal shopping device is recharging.

Information Management Hierarchy

Figure 4A:
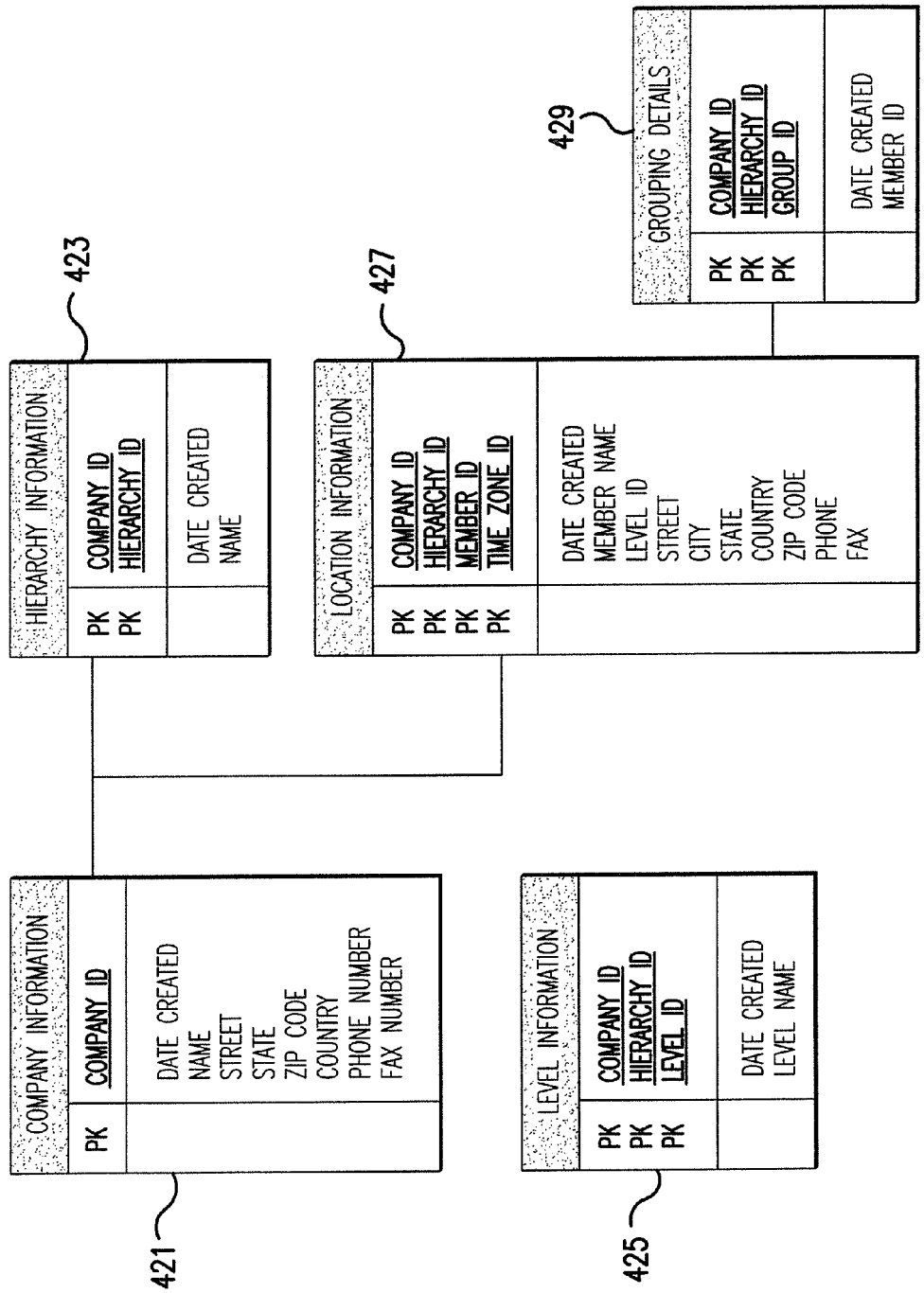
FIG. 4A depicts an exemplary diagram of the relationship of some of the data tables consistent with the principles of some embodiments of the present invention.

Information relating to the plurality of shopping establishments, the companies that own the shopping establishments and the customers shopping within the shopping establishments may be stored in a manner that enables real-time access to accurate current and historical data. FIG. 4A depicts exemplary data tables consistent with the principles of some embodiments of the present invention. It may be appreciated that the data tables depicted in the figures may include additional information that is not discussed herein. Further, it may be appreciated that additional tables may be stored including additional information relating to the companies, the shopping establishments, and/or the customers. For example, additional information may be stored relating to the customer's shopping experience, including shopping lists, items, price, and quantity of items purchased, click-throughs of the user interface, customer demographic data as discussed above, path of the customer through the store, advertisements that were presented to the customer, coupons used by the customer, etc.

As depicted in FIG. 4A, a plurality of data tables are provided. Data tables may be implemented using an Excel spreadsheet application by Microsoft Corporation, Macromedia Flash application by Adobe Systems Incorporated, a dynamic HTML application etc. The data tables may include Company Information 421, Hierarchy Information 423, Level Information 425, Location Information 427, and Grouping Details 429. FIG. 4A depicts the association between the data tables. Exemplary details of the data tables depicted in FIG. 4A are set forth in FIGS. 4B-4C.

Company Information 421 stores information related to the company, including the company ID, as a primary key, and further includes the date the company record was created in the data table, and the name, street, state, zip code, country, telephone and fax number of the company.

Hierarchy Information 423 stores information relating to the hierarchy definitions and includes Company ID and Hierarchy as the primary keys, and further includes the date the record was created and the name of the Hierarchy.

Location Information 427 stores information relating to the individual locations of each of the shopping establishments of the companies stored in Company Information 421 and includes Company ID, Hierarchy ID, Member ID and Time Zone ID as primary keys and further includes the date the record was created, the member name, level ID, street, city, state, country, zip code, phone and fax number of the shopping establishment. Location Information 427 establishes which individual shopping establishments belong to which levels.

Level Information 425 stores information relating to the level definitions and includes Company ID, Hierarchy ID, and Level ID as primary keys and further includes the date the record was created in the data table and the level name.

Grouping Details 429 stores information relating to the groupings, or roll-ups of the shopping establishments and includes Company ID, Hierarchy ID, and Group ID as primary keys and further includes the date the record was created and the member ID. Grouping Details 429 associates individual shopping establishments to certain groups.

Each of the data tables further stores information relating to whether the records included therein are active or inactive. For example, if a store moves locations, then a new record may be created within Location Information 427 maintaining the member ID but updating all of the other stored data in the new record. The old record of the closed store will be saved in the data table, however the record may be indicated as being inactive.

By storing the information in this manner, as companies and individual shopping establishments change locations, a simple update to the tables discussed herein, while maintaining the historic data provides for real-time data access to the current and historic data. For example, if Member ID 1001 moves location to Zone-California South, a new record is created in Location Information 427 listing Member ID 1001, the new time zone ID, the date the new record was created, the member name, and the new Level ID associated with the new location. In addition, the old record is marked as inactive and the date the record was marked inactive is stored. None of the other tables need to be updated. The new information is maintained as current information, and the historic information is maintained for data mining purposes.

As such, any time any of the values represented in the tables need to be updated, only those tables that store the value to be changed need to be updated.

By establishing and maintaining the tables in this manner, real-time current and historic data may be data mined. For example, as the active/inactive status of records and the date records are created and the date records go inactive are stored, while still maintaining the data after records go inactive, by clarifying at least one of Company ID, Hierarchy ID, Member ID, Level ID, Group ID, time period, or any other information stored in the tables, accurate real-time current and historic data may be obtained.

It may be appreciated that records may be established in order to enable a company to select certain shopping establishments for targeted advertising, without being limited to the previously established levels in the table. For example, a new record may be established in Level Information 425 with a level ID 99999. Company 1 may wish to provide an advertisement for Tide detergent only to store member ID Nos. 1001, 10001, and 10002. By adding new records in the Grouping Details 429, where store member ID No. 1001, 10001, and 10002 have Group ID No. 99999 (in addition to group ID Nos. already assigned, i.e., 10001, 1000000, and 1000000, respectively) the company can designate the Tide detergent ad be displayed to customers associated with Group ID No. 99999. This provides added functionality because Company ID 1 is not limited to sending the advertising to all of the stores within the levels that may already be defined within Level Information 425. Company ID 1 may, in a simple manner, target advertising to specific stores, regardless of predefined levels. It may be appreciated that this may save the companies money in advertising costs, administrative costs, etc. It may further be appreciated that, in addition to selecting stores to target advertising, a company may similarly select among the demographic customer information, customer's shopping history, etc., to target advertising. It may further be appreciated that by establishing such a 99999 record, information regarding the predefined levels are not affected. As such, data mining for the predefined levels remains the same, while providing the added functionality of defining levels for targeted advertising.

It may be appreciated that similar functionality may result by adding new hierarchy Ids in the Hierarchy Information table.

It may be appreciated that additional tables may be provided for maintaining customer information. For example, a Customer Information table may be provided including primary key Customer ID, and storing demographic information of the customer including age, age range, gender, date of creation of customer record, number of members in the household, number of children, age and gender of the children in the household, household income, etc. Further a Shopping Transaction table may be provided including primary keys for Customer ID, Transaction ID and Location ID, and further including date, type, quantity, price, etc., of products purchased, click-though data, advertisements viewed, date, time and cart path of shopping trip, entry time and exit time of each zone during each shopping trip, etc.

It may be appreciated that additional information may be stored in these tables to expand data mining results.

It may be appreciated that all of the tables discussed herein may by stored at application server 106, 108, 122, 124, and/or database 142, 144.

Self-Healing Planogram Application

Figure 5:
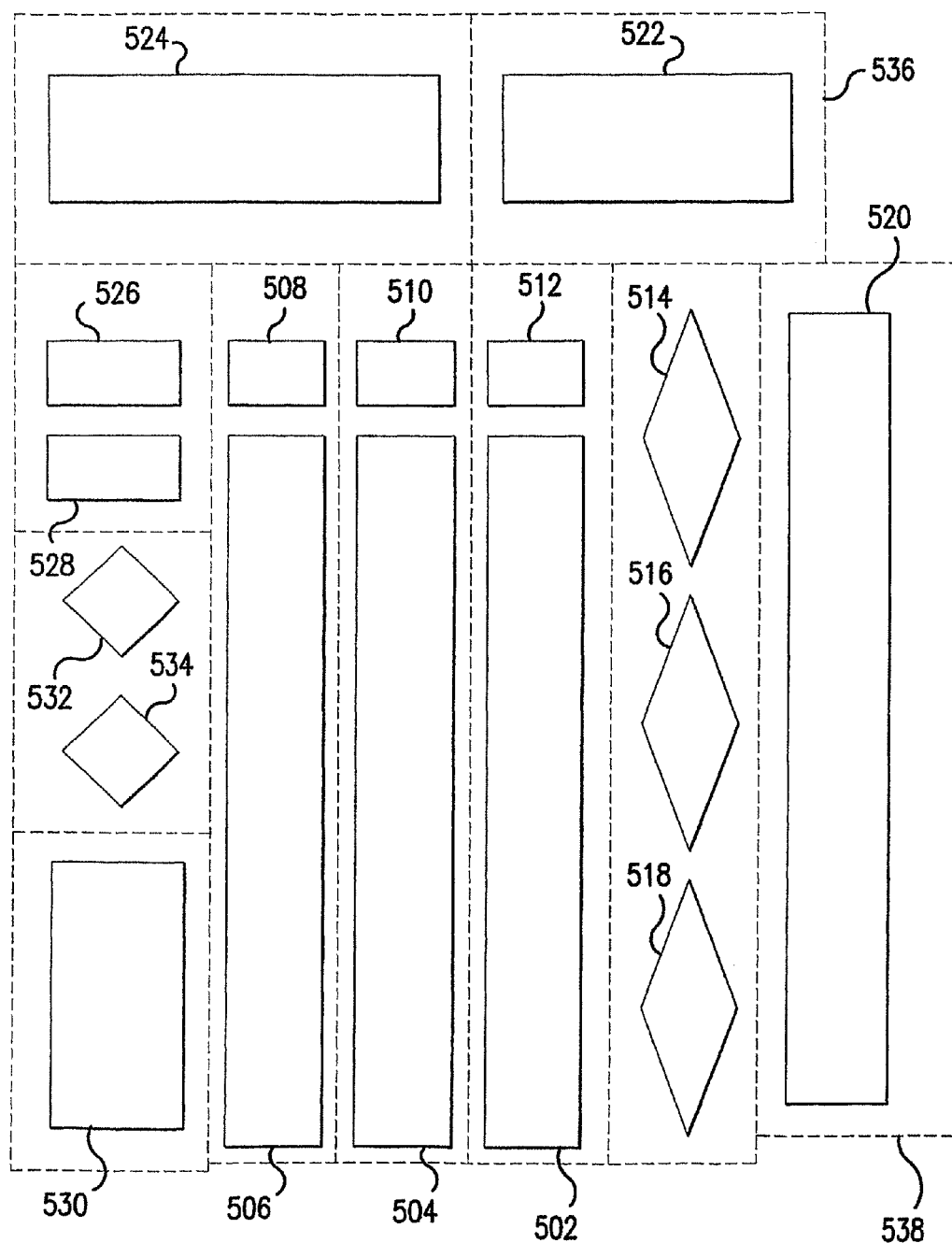
FIG. 5 depicts an exemplary planogram consistent with the principles of some embodiments of the present invention.

For each store, application servers 120, 122, 106, 108 may store in memory the store's planogram, i.e., a design that shows where specific products are laid out on retail shelves or displays. FIG. 5 depicts an exemplary planogram consistent with principles of some embodiments of the present invention. As depicted in FIG. 5, the store includes aisles 502, 504, 504, end caps 508, 510, and 512, produce displays 514, 516, 518, 520, dairy display 522, meat and seafood display 524, wine display 526, 528, hot food/salad bar display 532, 534, and bread display 530. For example, the store may be broken down into a plurality of zones and each product in the store may be designated as being located within a particular zone. As shown in FIG. 5, dairy display 522 may be identified as zone 1 536, and produce displays 514, 516, 518 may be designated as zone 2 540.

It may be appreciated that the data relating to each store's planogram may be stored in data tables with similar structure discussed above with regard to the information management hierarchy.

Information may be stored relating to the location of products within the shopping establishment. For example, for each of the plurality of zones depicted in FIG. 5, information may be stored identifying the metes and bounds of each of the plurality of zones and information relating to the location and descriptive information associated with the products located within each zone. FIG. 6 depicts exemplary tables that may be utilized in storing information within the shopping establishment. As shown in FIG. 6, table A 600 stores the boundaries of each of the plurality of zones, i.e., the metes and bounds of each of the plurality of zones, in the shopping establishment. Col. 602 identifies each zone, col. 604 identifies the minimum coordinates of each of the zones and col. 606 identifies the maximum coordinates of each of the zones. It may be appreciated that alternatively methods may be utilized in identifying the metes and bounds of each of the plurality of zones. Col. 611 identifies the location identification of the shopping establishment.

Further table B 608 may store information about each of the products included in the shopping establishment, including a specific location of the product within the zone, descriptive information relating to the product, etc. For example, table B 608 includes a SKU #, a unique identification number that uniquely identifies a particular product, a Zone ID, representing the zone that the product is located in, and a product number. It may be appreciated by one skilled in the art that additional information may be stored in these tables.

One of ordinary skill in the art may appreciate that alternatives to zones may be implemented in storing information relating to the positioning of products within the shopping establishment, i.e., the store may be broken down into smaller or larger areas; etc.

The planogram discussed herein may be self-healing, in that there does not need to be any user interaction to update the product location information stored in the tables, for example, in the event that the product display has been relocated within the shopping establishment. As noted above, the tables store information identifying the location of each of the products located in the shopping establishment. When a consumer scans an item and places the item in his shopping cart, the personal shopping device receives the bar code information. This information may be uploaded to application servers 106, 108. This information may further be associated with the position information of the personal shopping device. The system may assume that the consumer placed the item in the cart at approximately the same location where the consumer took the item from the shelf/display. The location information may be compared with the location information stored in the tables. If the information is different, the system may flag the item and, if a predetermined number of consumers are placing the same item in the their carts at the new location, the system may automatically set the entry of the item in the tables as "inactive", and create a new entry in table B identifying new position or zone of the item. Thus, the planogram does not necessarily need to be manually updated. It may be self-healing in that, as consumers shop within the shopping establishment, the tables may be automatically updated.

When a consumer performs a search for a product, as discussed below, these tables may be searched to identify the location of the product within the shopping establishment. Further, the consumer may use the information in these tables to access the location, direction and distance to the product based upon the current personal shopping device location.

Further, data mining may be performed to determine where a product sells the best. By viewing data relating to where the item was located and how many customers purchased the item, the shopping establishment may determine where to place an item achieving optimum sales.

User Interface

Consistent with some embodiments of the present invention, the user interface of the personal shopping device may be generated based on stored customer information. This customer information may be collected at the time the consumer signs up for a loyalty card/key fob, etc. The information may be stored at store server 110, application servers 106, 108, application servers 120, 122, and/or databases 142, 144. The user interface may alternatively be generated based on stored customer information that is collected based on a customer's past shopping experience and/or may be generated based on a combination of the customer information collected at the time the consumer signs up for the loyalty card/key fob, etc., and the shopping history information.

When registering for a loyalty card, key fob, etc., the customer may be asked for personal information. For example the customer may be asked for age, sex, address, zip code, number of family members in the household, number of children, age of children, household income, etc. All of the information provided by the customer may be stored as indicated above. Additionally, information may be stored regarding the date of the last shopping trip of the customer, the duration of the last shopping trip, etc.

Different display attributes may be stored in memory and associated with the different categories of customer information. Certain display attributes may be associated with gender, age and/or age group, race, address, marital status, number of children, sex of children, etc. For example, if the customer is female, then the display may have a certain color background that may be more appealing to females; if the customer is Spanish and the customer's first language is Spanish, then the text displayed on the display may be in the Spanish language; if the customer's eyesight is poor, this information may be associated with a large font size, etc.

Information may further be stored relating to a customer's past shopping experience. For example, each time the customer touches the personal shopping device, the buttons selected by the customer may be stored. This data may be accessed in order to determine how frequently the customer selected each of the menu options on the personal device. If the system determines that the customer uses the shopping list feature the more frequently, then the actuatable button representing the shopping list function may be more prominently displayed on the user interface, i.e., at the beginning of the list of actuatable buttons, displayed as a larger button than the other actuatable buttons, etc. The next most frequently used feature may be displayed second in the list, as the second largest button, etc.

The content to be displayed on the personal shopping device may be stored and associated with the different categories of customer information. The content displayed on the personal shopping device may be displayed based on the stored customer information. For example, if the customer is Spanish, the recipes offered to the customer may be from the Spanish culture, i.e., paella, beans and rice, etc.

In addition, the weekly flyer may be generated dynamically based on customer information. The advertisements eligible for the weekly flyer may be associated with different categories of customer information; the advertisements eligible for the weekly flyer may be associated with particular types of products, etc. For example, if the customer has a newborn baby, the weekly flyer may include an advertisement for diapers. Alternatively, based upon access of the customer's shopping history and past purchases, the system may determine that canned corn is frequently purchased. Based upon this determination, the weekly flyer may include an advertisement for canned beans, based upon the association of the canned beans with canned vegetables. For another example, an advertisement eligible for the weekly flyer for chips may be associated with soft drinks. These associations may be determined by a store employee, the advertiser, the manufacturer, etc.

In addition to the advertising included in the weekly flyer, additional advertising may be displayed on the personal shopping device based on the customer information during the customer's shopping experience. This additional advertising may be associated with particular products. The system may store information regarding the particular items, quantity, etc. a customer purchased in the past. The additional advertising may be selected and displayed on the personal shopping device based on, for example, the most frequently purchased items. For example, the application server 106 may access the customer's shopping history and determine the top, for example, eight, products the customer purchases most frequently. Advertisements associated with the eight most purchased products may be displayed to the customer throughout the shopping trip randomly; may be displayed based on the position of the personal shopping device within a predetermined distance of the product, etc.

Personal Shopping Device

Consistent with some embodiments of the present invention, the use of the personal shopping device provides certain functionality to the consumer to enhance his shopping experience. Some examples of this functionality include personalized offers, as discussed above, storage of shopping history, item search/locator, price check and/or suggestions of alternative products, access to recipe information, an interactive shopping list, self-scanning, etc.

Figure 7A:
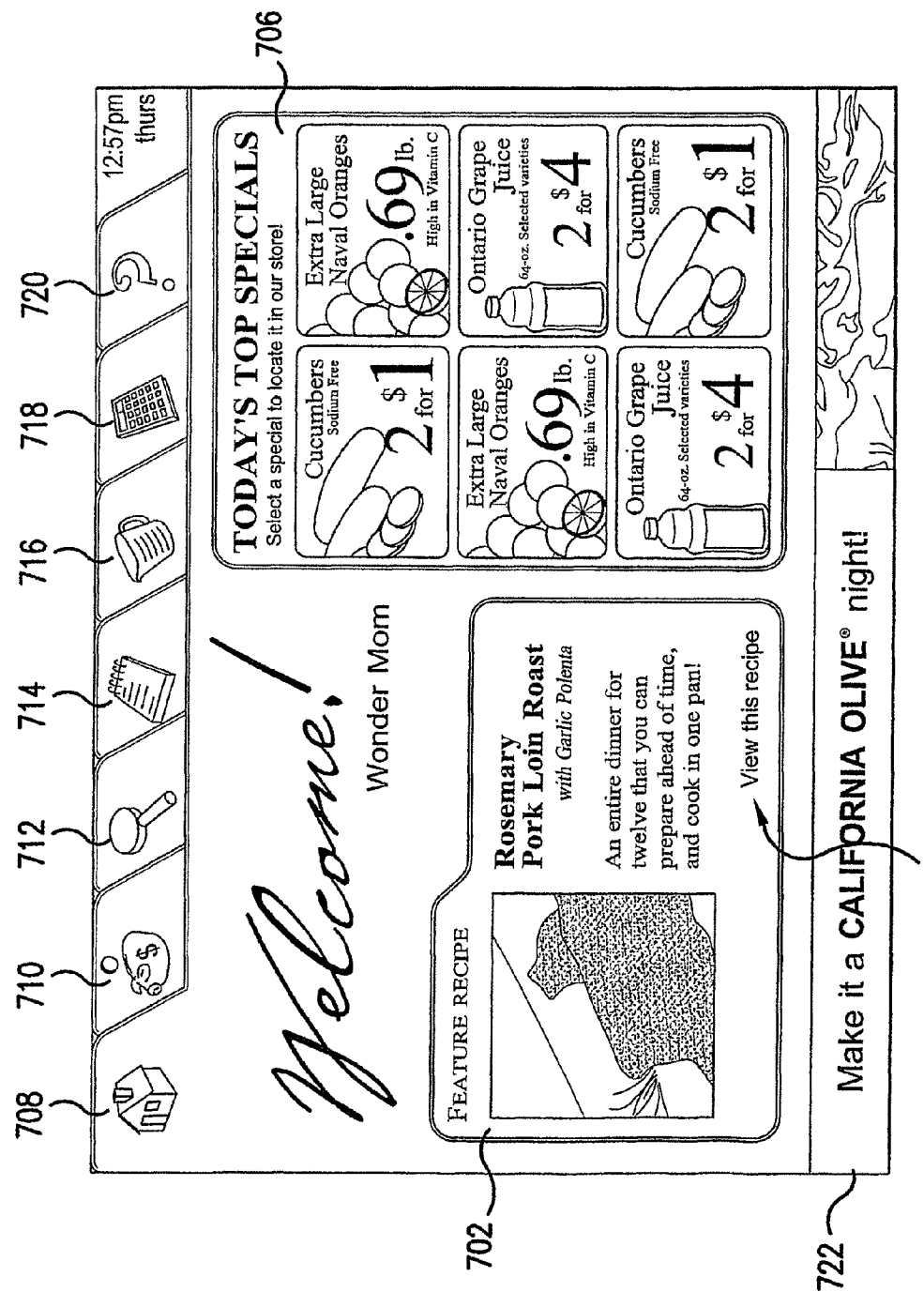

Upon access to the personal shopping device, as noted above, the consumer may view an exemplary screen shot as depicted in each of FIGS. 7A-7D. As shown in FIG. 7A, a featured recipe is advertised. If the consumer wishes to view the recipe and the ingredients of the recipe, the consumer may select the "view this recipe" button 704. Upon selecting button 704, the recipe may be displayed together with a shopping list of the ingredients that are needed to make the dish. In addition to the featured recipe, the shopping establishment's top specials 706 may be displayed. Further, menu items 708 are provided wherein the consumer may select any of the menu items. For example, the user may select home 708 wherein the consumer may be directed to the home page of the application. The consumer may further select 710 in order to access additional daily specials. These daily specials may be specials offered to all consumers within the shopping establishment or may be special offers made to the consumer based upon the consumer's shopping history. The consumer may further select 712 in order to access the product directory to, i.e., search for a product in the store. The consumer may select 714 to access the consumer's personal shopping list. The consumer may select 716 to access recipes. The consumer may select 718 to access an electronic calculator, a calculation application that allows the consumer to perform basic math computations. The consumer may select 720 to access a help application that explains how to use the personal shopping device. Additionally, section 722 presents passive advertising to the consumer, similar to banner advertising.

Figure 7B:
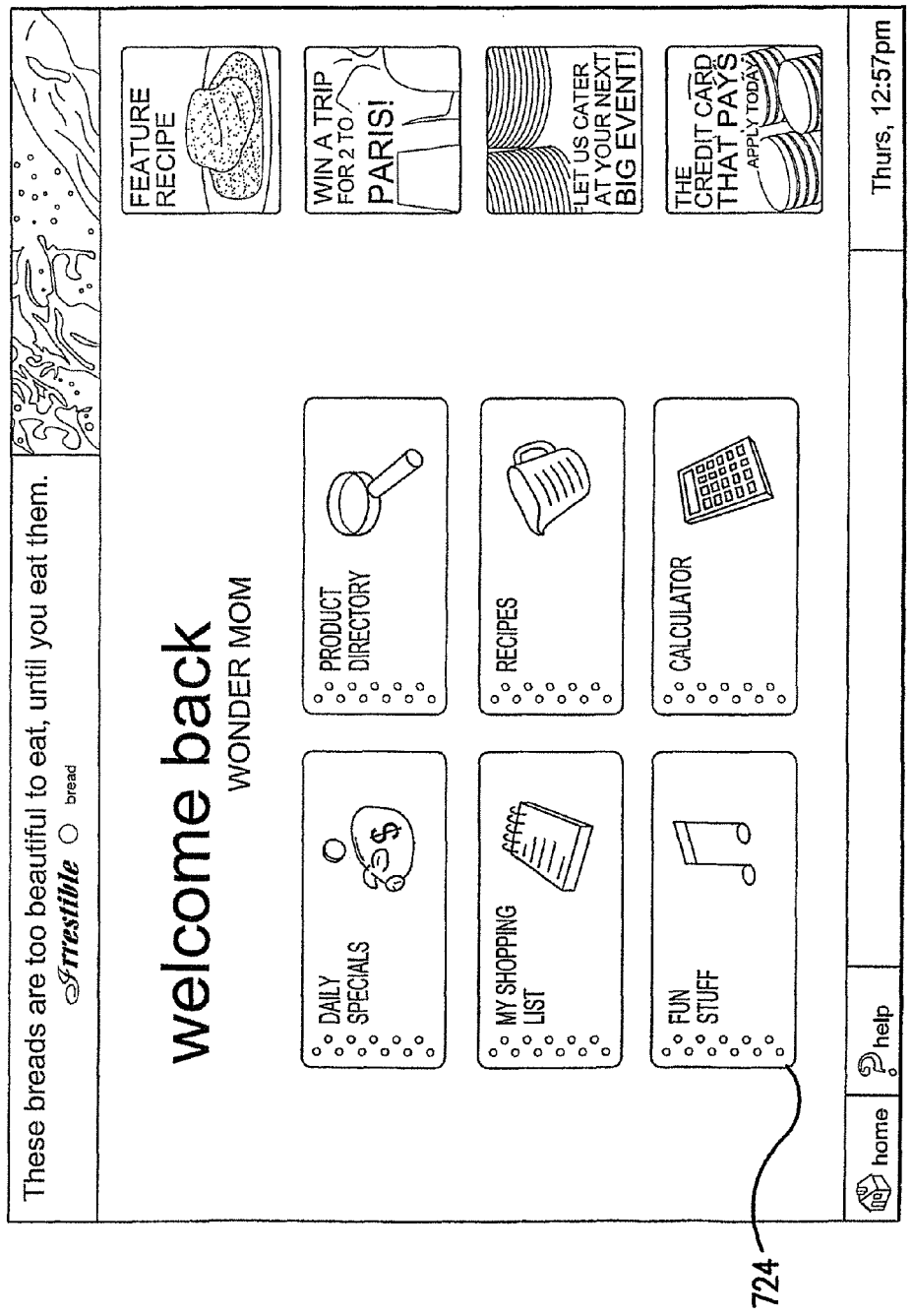

FIG. 7B depicts an alternative exemplary screen shot that may be displayed to a consumer upon access to the application on the personal shopping device. Alternatively, as depicted in FIG. 7B, the user may select fin stuff 724 to access entertainment information. For example, if the consumer was shopping with a child, the consumer may access appropriate entertaining videos to occupy the child while the consumer was shopping. Alternatively, the consumer may access music information for the consumer to listen to while shopping. Alternatively, the consumer may purchase this information and store it on the consumer's personal key fob 140. This information may subsequently be transferred to a device at the consumer's home.

Figure 7C:
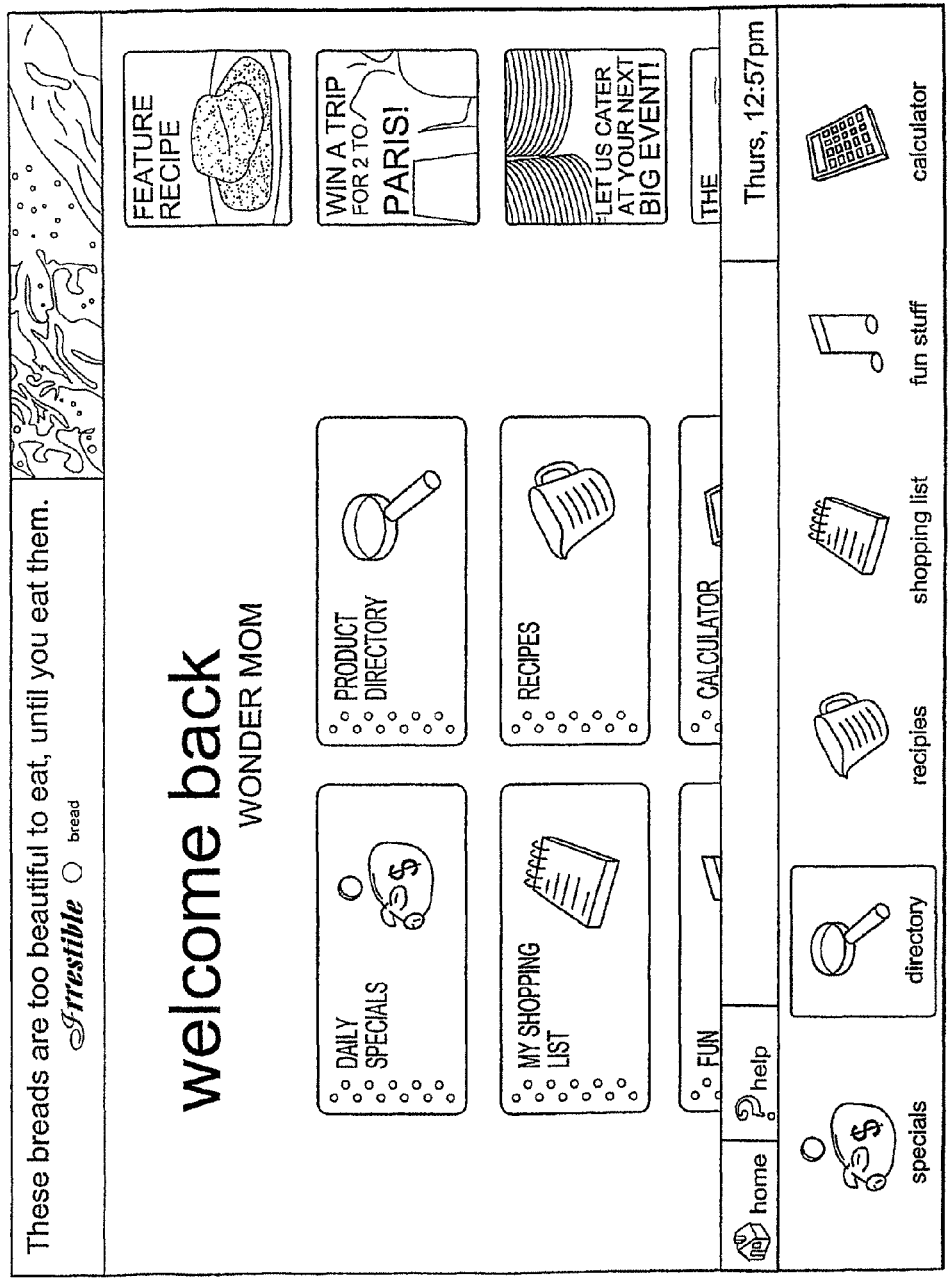
Figure 7D:
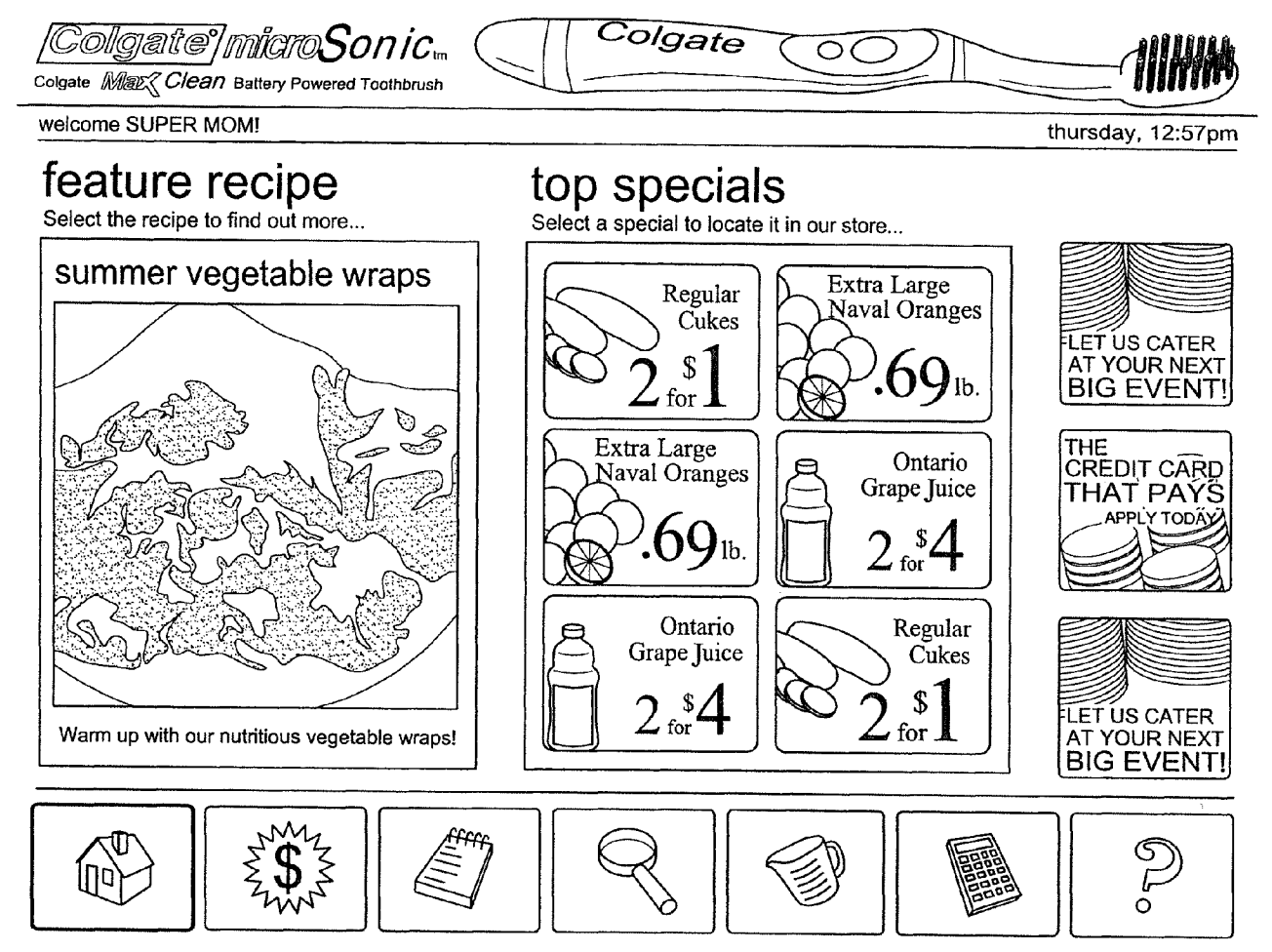

FIGS. 7C-7D depicts alternative exemplary screen shots that may be displayed to a consumer upon access to the application on the personal shopping device.

It may be appreciated by one skilled in the art that the display of the personal shopping device may be flipped, rotated, etc., so that a person sitting in the cart may properly view the information appearing on the display of the personal shopping device. It may further be appreciated that the personal shopping device may include speakers, an earphone assembly, microphone (to enable the consumer to interact with the personal shopping device through voice), etc.

As the customer uses the personal shopping device, information regarding the customer's interaction with the personal shopping device is stored, including products scanned (type of product, price, quantity, time of scan, etc.), advertisements displayed, time advertisements were displayed, clickthroughs, products searched, cart path, counter services ordered (including the details of the order), shopping list information, date of shopping trip, start and end time of shopping trip, etc. The information may be stored at the personal shopping device during the customer's shopping experience. The information begins being compiled at the personal shopping device when the customer logs on. During the customer's shopping experience, the information regarding the customer's interaction may be stored, for example in a flat file, at the personal shopping device. The flat file may include a customer ID, a shopping establishment location ID, start date, start time, stop date, stop time, advertisement ID representing advertisements displayed, time of advertisement display, time spent is different zones within the shopping establishment, start and stop time entering and leaving zones within the shopping establishment, products scanned, click-throughs, etc. After the customer logs off the device, the personal shopping device may filter the flat file and transmit the filtered flat file to store server 110, and/or application server 106, 108. Store server 110 and/or application server 106, 108 may update the appropriate data tables with the information stored in the filtered flat file and/or may transmit the filtered flat file to application server 120, 122 for processing and storage of the data in database 142, 144.

It may be appreciated that alternatively, the personal shopping device may trigger interaction with other devices within the shopping establishment. For example, kiosks, displays, and other computing devices, may be situated throughout the shopping establishment that may provide additional and/or enhanced services to the customer. Based on the customer's position in the shopping establishment, the system may determine that a customer is physically close to another computing device. The system may instruct the other computing device to active and play content engaging the customer to use the other device and offer the enhanced and/or additional services. Some examples of services that may be provides at the displays/kiosks may include printing of coupons, printing, access, and/or searching of recipes, printing of pictures ordered using the photograph counter services application, recording of media on a removable storage device, customized searching on the Internet based on the stored customer information, purchasing of lottery tickets, obtaining funds from an automatic teller machine where the kiosk is communicably linked to the customer's banking company, validating parking and alternatively, validating parking were the parking fee is added to the customer's shopping check-out total, media rentals including video tapes, DVDs, etc., postal service kiosks wherein the customer may mail a package, and alternatively, the customer's cost for mailing the package may be added to the customer's shopping check-out total, providing fast food or snack food services wherein the cost of the food may be added to the customer's shopping check-out total, providing personalized audio/video directed to the customer, provide games to the customer, provide advanced input features to enable the customer to provide comments or responses to surveys regarding the customer's shopping experience, providing instructions videos to the customer or members of the customer's family, printing customized books, i.e., coloring books, story books, etc., wherein the book is customized to the customer or members of the customer's family, enable searching for and provide event tickets, purchase mobile/cellular telephone cards and/or replenish mobile cellular telephone minutes, enable searching for and provide airline tickets, suggest products for purchase based on stored customer information, i.e., where the product is physically located near the kiosk/display, the product may be suggested based on age, gender, etc., offering voice-over-IP services where the kiosk is communicably linked to the Internet, etc.

Dynamic Advertising

Advertisements may be dynamically generated based on customer information stored within the system. A manufacturer may identify an ad template that may incorporate static components of the ad. Additionally, the manufacturer may further identify dynamic components of the ad that may be associated with certain categories of customer information. The dynamic components may have a priority associated with them For example, the manufacturer may provide a template that indicates that Tide detergent is on sale. The price of the detergent and the graphic of the price may be incorporated as the static component of the ad. Further, a dynamic component including a graphic of a mother with a child may be associated with the family category having a young child. Still further, a dynamic component of a graphic of an older woman may be associated with an age range of 55-65. When the system determines that a certain customer is to receive the Tide advertisement, the system accesses the customer information. Based on the associated priority information and/or the customer information, a customer of 60 years of age will view the Tide advertisement having the static components and the dynamic component of the graphic of the older woman. As such, the advertisement may be dynamically generated and presented to all customers where the advertisement will appeal to the particular customer that is viewing the advertisement, as the dynamic components may be tailored to specific customer that is viewing the advertisement.

Given the real-time capabilities of the system, the return on investment based on the advertising may be realized. As the personal shopping device and/or the system is storing information regarding the advertising that is being viewed by the customer, the items that are being scanned for purchase, and when the items are being scanned, the system may determine the effectiveness of the advertising in real time. The system may process and store information relating to how may customers scanned the advertised product. If the number is low, then the advertisement may be deemed to be ineffective. This information may be reported back to the manufacturer and the manufacturer may decide to update the static and/or dynamic components of the advertising.

Alternatively, a manufacturer may be able to set thresholds and modify the advertising based on the effectiveness of the advertising. For example, the manufacturer, user, etc., may be able establish that an advertisement needs to be 30% effective; that out of 100 customers viewing the advertisement, 30 customers must purchase the advertised item. If this effectiveness is not achieved, system may automatically i.e., modify the advertising graphics, expand the target audience of the advertising, generate a message to the manufacturer advising of the ineffectiveness of the advertisement, etc. Alternatively, the system may automatically generate reports to the manufacturer at predetermined time(s) advising of the effectiveness of the advertisement(s).

Alternatively, payment for the advertising by the manufacturer may be dynamic based upon the effectiveness of the advertisement. For example, the manufacturer may be billed a lesser amount if only a few customers purchased the product after viewing the advertisement, and may be billed a higher amount if many customers purchased the product after viewing the advertisement.

Alternatively, after viewing the effectiveness of the advertising, the manufacturer may determine that certain dynamic components are more effective than other dynamic components and may decide to modify the priority or the categories of customer information that may be used in generating the advertisement.

Further, the utilizing the data stored in the data tables, a company may be able to determine if a customer is traveling to purchase products. For example, if a customer with one zip code is shopping at a shopping establishment in a different zip code and purchasing products that the customer is not purchasing at a shopping establishment located in the customer's zip code, the company may be able to determine that there is a need for a particular product in the customer's zip code. The company may then provide the needed product at the customer's shopping establishment, making the customer's shopping experience more productive and increasing sales.

It may be appreciated that other types of dynamic advertising may be displayed to the customer based on the customer's stored information. For example, if the customer previously paid for their purchases with a Bank of New York bank card, the system may store information that the customer holds an account at the Bank of New York. During the customer's shopping experience, a Bank of New York advertisement may be displayed promoting the bank's services.

Interactive Shopping List Application

The consumer may further access his personal shopping list using his personal shopping device. For example, the consumer may generate his shopping list at his home computer and download the shopping list to his key fob 140. After the consumer puts the key fob 140 into the personal shopping device and after the consumer is verified, the shopping list may be retrieved from the key fob 140. Alternatively, the consumer may access an application at application sever 120, 122 and enter his shopping list using his home computer. This shopping list may be downloaded to the personal shopping device after the consumer is verified.

Once the shopping list is retrieved, the consumer has the opportunity to add, remove or edit items on the shopping list. Alternatively, the system may retrieve the shopping history of the consumer to identify those items that the consumer purchases on a regular basis. For example, the system may determine that the consumer purchases ½ gallon of milk each time the consumer shops. Once the consumer is verified, the system may access the shopping history of the consumer and compare the regularly purchased items with the items on the consumer's shopping list. If there is an item that the consumer normally purchases that is not located on the shopping list, the system may prompt the consumer asking if the item should be placed on the shopping list. This may help to ensure the consumer's shopping list is complete. Further it helps to generate sales for the shopping establishment.

In addition, the consumer has the ability to enter budgeting information. Upon receipt of the budgeting information, the personal shopping device may analyze the interactive shopping list and the budgeting information and search the information stored in table B to suggest a list of proposed products that will ensure the consumer stays within budget.

As the system stores both shopping list information and information relating to the items purchased by the customer, the system may generate reports that show the purchasing trends of the customer. For example, the system may determine what products the customer intended to purchase from the shopping list information, and what products the customer did and did not purchase. Further, the system may determine the effectiveness of advertising based on the items intended to purchase on the shopping list, the advertisements that were displayed to the customer, and the actual products purchased.

Alternatively, the system may generate the shopping list for the next visit to the supermarket based on the actual purchases of the customer during the current visit to the supermarket. This list may be modified by the customer at the customer's home using the network application at application server 120, 122, and/or at the supermarket during the customer's next visit.

The shopping list may be updated as the customer is shopping. Each item for purchase by the customer is scanned, for example, using a bar code reader at the personal shopping device. The personal shopping device may send the scanned information to store server 110 or application server 106, 108 to obtain the associated product information. Additionally, the product attribute information may further be accessed. The product information and the product attribute information may be transmitted to the personal shopping device. The customer's shopping list may then be processed to determine if the scanned product or an associated product is on the list. If the product is on the list, the product is checked off as selected for purchase. If the product is not on the list, the product may be added to the list. At the end of the customer's shopping trip, all of the items in the shopping cart may be included on the customer's shopping list. This list may be stored locally on the personal shopping cart and/or stored at application server 106, 108 120, 122.

Price Check Application

As noted above, personal shopping device may include a bar code reader. The consumer may scan a product to perform a price check. If the consumer wishes to discern the cost of a product, the consumer may scan, i.e., the bar code, of the product. The bar code information is received at the personal shopping device. The price information may be stored at the personal shopping device, may be stored at the application servers 106, 108, or may be stored at buffer server 107. If the price information is stored at the application servers 106, 108, or buffer server 107, the personal shopping device may transmit the price check request to the server storing the price information, i.e., application servers 106, 108 or buffer server 107. The request is received at the appropriate server, the memory queried, and a response may be transmitted back to the personal shopping device. The response may then be displayed to the consumer.

Item Search Application

Each of the products for sale in the store may be stored at store server 110, application server 106, 108, application server 120, 122, and/or database 142, 144. Associated with each of the products may be keywords that help identify the product. For example, Tide detergent may be stored and key words associated with Tide detergent may be laundry, soap, detergent, etc. The consumer may query the system attempting to locate a particular item. The item may be located based on the product, or the key words associated with the product. For example, if the customer is searching for Tide detergent, the customer may enter in "laundry soap." Based on the key words associated with Tide detergent, including "laundry" and "soap", Tide detergent may appear as a response to the customer's query.

For another example, the consumer may submit a request seeking to find the location of light bulbs. Upon submission of the request, the personal shopping device either searches its own memory, if the information is stored locally, or prepares and submits a query to the application servers 106, 108 or buffer server 107, if the information is stored at one of these servers. Upon receipt of the query, the appropriate server searches its memory and identifies the location of the product within the shopping establishment. The server then prepares a response to the query and transmits the response to the personal shopping device. The personal shopping device then displays the location of the product on the display of the personal shopping device. Alternatively, the personal shopping device or the server may calculate a set of directions based upon the current position of the personal shopping device wherein the directions may be provided to the consumer. This information may be provided to the consumer in a number of ways, including merely identifying the aisle the product is located in, directions, in the form of text, to direct the consumer to the searched product, a map being displayed on the display providing the consumer with a marked path to the product, etc.

Alternatively, in addition to ads, a manufacturer may purchase certain key words that may only be associated with the products stored in the system. For example, the Tide detergent manufacturer may purchase "laundry" as a key word associated with Tide detergent. No other manufacturer may have the word "laundry" associated with their product. Each time a customer searches for a product using the key word "laundry", only Tide detergent will appear on the list. This may provide an added benefit to the manufacturer as only their product is identified on the search result list, thus reducing competition. Alternatively, manufactures may identify certain stores where their key words are associated with certain products. These selected stores may be based on location.

Alternatively, when a customer searches for a product, and an advertisement is associated with one of the products on the search result list, the customer may be presented with an advertisement that corresponds to a product on the search list.

Alternatively, after the system determines what product the customer is searching for, the inventory database, discussed below, may be queried to determine if there is stock on the sought after item. If there is no stock left, the system may suggest a substitute product. Alternatively, the substitute product may be offered with an advertisement and/or coupon as an incentive for the customer to purchase the alternative item. Still alternatively, the customer may be provided a "rain check" that may be stored within the system, on the customer's loyalty card, key fob, etc. Further if the item is a sale item, the sale price may further be stored and applied during a later shopping trip.

Self-Scanning Application

The consumer may scan a product when the product is placed in the cart for purchase. Upon the scanning of the item, the personal shopping device may store the information indicating that the consumer wishes to purchase the scanned product. At any time, the consumer may review the list of items placed within the cart. This may be beneficial if the cart is particularly full and the consumer is not sure if a particular item on the shopping list was picked up. Upon scanning the item, the interactive shopping list may be searched to determine if the scanned item is on the shopping list. If the scanned item is on the interactive shopping list, the interactive shopping list may be automatically updated and an indication may be made in the interactive shopping list that the item has been picked up for purchase. Upon check out, the information identifying the products that have been scanned into the personal shopping device and placed in the cart may be transferred to a checkout device. This may reduce the amount of time the consumer spends checking out. After a consumer checks out, the information identifying the products purchased may be transmitted, through application server 106, 108 to application servers 120, 122, for storage in databases 142, 144. Alternatively, application servers 106, 108 may include databases that store the information locally. This stored shopping history may be used for many purposes as discussed herein.

Alternatively, certain products within the shopping establishment may include a RF ID tag. The RF ID tag may be active or passive. A product on a shelf with the tag may be active. When the customer registers the product with the personal shopping device and being intended for purchase, the personal shopping device may change the RF ID tag to passive. At the time of checkout, the customer's cart may be scanned to determine if there are any active tags in the shopping cart. An active tag in the customer's shopping cart indicates that the customer did not properly scan the product for purchase.

Searching for Alternatives Application

The consumer may scan a product and search for a similar or cheaper product. For example, the consumer may scan an item that is 64 ozs. and costs $8.00. However, maybe the consumer may only need 6 ozs. of the product or maybe the consumer does not wish to pay $8.00. The consumer may select a certain application within the consumer interface at the personal shopping device wherein the product directory may be searched to locate a similar product that is smaller and/or does not cost as much. Alternatively, the consumer may scan a particular product, i.e., Mr. Clean, a cleaning product. The system may identify a similar product that is on sale, or has a computer-generated discount available, and display the alternative to the consumer. The consumer may then take advantage of the information offered to the consumer. For example, the consumer may receive information from the system identifying a computer-generated discount for Lysol cleaner. The consumer may decide to use the computer-generated discount and purchase Lysol instead of Mr. Clean. Upon scanning the Lysol, the system may take note of the use of the computer-generated discount so that, upon checkout, the consumer may receive the discount without having to "clip coupons", produce any paper notification of the discount, etc.

Recipe Application

In addition to the recipes discussed above, the consumer may search memory located in the personal shopping device and/or application servers 106, 108, 120, 122, for recipes. The recipes may alternatively be provided by a manufacturer through manufacture server 126. Upon selection of a recipe, the ingredients of the recipe may be placed on the consumer's interactive shopping list. The consumer may make an indication through the consumer interface to remove the item from the interactive shopping list. Further, the consumer may store the recipe on the key fob 140 for downloading at the consumer's home personal computer. Alternatively, the consumer, through personal shopping device 102, 104, may e-mail the recipe to himself for viewing at, for example, home, or the consumer may direct the recipe be printed out at a printer located, for example, at the shopping establishment.

It may be appreciated by one skilled in the art that the personal shopping device may provide the consumer the capability to browse and access servers 134, 136 on the Internet to access information including recipes.

Store server 110, application servers 106, 108 and/or application servers 120, 122 may store information relating to recipes. These servers may further store, or have access to data associating the ingredients of the recipes with certain products in order to assist the customer during the shopping experience. These products that are associated with the ingredients may be store brand products, name brand products, etc. The customer may be provided with an option of selecting whether the products associated with the ingredients for the recipe are store brand products or name brand products. For example, if the customer was shopping at Safeway Supermarket, Safeway may want to promote their store brand products. When a customer selects a recipe to view, additional information may be displayed identifying Safeway brand products that should be purchased in order for the customer to make the recipe.

Alternatively, the customer may have the option to select certain recipes based on characteristics of the dishes produced by the recipe. For example, the customer may select a recipe and may further select a low sodium version of the recipe, a diabetic friendly version of the recipe, a low fat version of the recipe, etc. Additionally, the system may allow the customer to select how many people are being served and modify the recipe accordingly. For example, if the recipe serves 4 people, and the customer is serving 8 people, the system may automatically double the recipe. Further, the products associated with the recipe, taking into account that the recipe has been doubled, may be provided to the customer and/or added to the customer's shopping list.

Further, the customer may request a recipe based on other characteristics, including cost of products, number of calories per serving, amount of fat per serving, kosher ingredients, etc.

Further, the system may enable the customer to select a weekend meal plan, week meal plan, etc., wherein the customer may select several recipes to serve over the weekend, week, etc. Upon selection of the recipes, the associated products may be added to the customer's shopping list, and the meal plan and/or recipes may be stored on the customer's key fob or loyalty card, e-mailed to the customer, etc. The customer may be able to remove those items from the shopping list that the customer has at home.

Alternatively, the system may monitor the selected meal plan to ensure the selected meal plan conforms to a customer's diet. For example, if the customer is on a Weight Watcher's diet, the system may count the points per serving of the recipes selected by the customer and notify the customer of the point count, as a running total, as a final total count, etc.

Still further, the system may store information relating to wines that may be associated with recipes. If a customer has selected a certain recipe, the system may further recommend a wine that may go well with the selected recipe.

Smart Content

By storing information relating to the products that the consumer has placed in the cart, additional features may be realized. For example, the ingredients of the recipes stored in memory may be search and associated with scanned items in the consumer's shopping cart. For example, if the system determines that the consumer has purchased avocado, onion, and tomato, the personal shopping device, at the direction of application server 106, 108, 120, or 122, may prompt the consumer to purchase lemon and may further provide a recipe for guacamole. Further, directed offers, i.e., computer-generated discounts, may be made to the consumer. For example, if the consumer has selected $75 total merchandise for purchase, the personal shopping device may display an offer to the consumer to access a particular website to receive some incentive; if the consumer has purchased 3 bags of chips, the consumer may be offered a computer-generated discount to receive a free can of salsa etc.

Alternatively, the system may offer information to the consumer that is associated with particular products being purchased. For example, if the consumer scans Mr. Clean into the personal shopping device, the system may search its memory and offer cleaning tips to the consumer.

Inventory Management Application

In addition to the information discussed herein, inventory information may be maintained at store server 110, application server 106, 108, application server 120, 122 and/or database 142, 144. This inventory information may be updated in real time as the consumers purchase the products within the shopping establishment. For example, when a consumer scans Bounty paper towels at the personal shopping device, an inventory database that may be stored at store server 110, buffer server 107, application servers 106, 108, application server 120, 122, and/or database 142, 144 may be updated. Predetermined thresholds may be established so that when a particular product's inventory level drops to the predetermined threshold, the system may prompt a user at application server 106, 108, store server 110, and/or application server 120, 122 to order more of that product. Alternatively, the system may automatically generate an order that may be sent through application server 120, 122 to manufacture sever 126 for more of that product.

Similarly, the system may provide for predetermined thresholds to identify when there is an overstock of a particular item. If the system determines there is an overstock, the system may automatically generate a computer-generated discount or advertisement that provides incentive for the consumer to purchase the item in order to reduce the overstock situation. These computer-generated discounts may be offered consumers using the plurality of methods discussed herein.

Alternatively, the manufacturer may predefine a price where products may be offered to customers at the predefined price when an overstock situation occurs. This reduced price may be offered to the customers for a period of time, until the inventory reaches a normal or predefined level, etc.

It may be appreciated by one skilled in the art that applying the principles discussed herein, the shopping establishment owner may determine purchasing trends, anticipate further purchases and product arrays and quantities to be ordered upstream, etc.

Power Management Application

The system may further have the ability to monitor the power level of each of the plurality of personal shopping devices within or near the shopping establishment. Each personal shopping device may have a battery charge of a particular time period. Each personal shopping device may monitor its own power levels and may communicate the power levels periodically, or upon request, to application servers 106, 108. Alternatively, the system may be configured so that when the personal shopping device power drops to a predetermined level, an alert may be generated and send to application servers 106, 108. The power levels may further be provided to a consumer so that, should a consumer access a personal shopping device, and should the power level be low, the consumer may select a different personal shopping device to access. Further, upon receipt of notification that a personal shopping device is low on power, shopping establishment personnel may remove the personal shopping device from use and plug the device in to recharge.

Counter Services Application

Using the input device provided in the personal shopping device, the consumer may insert an external memory card, i.e., compact flash, memory stick, thumb drive, etc. to download image data. Using the consumer interface provided at the personal shopping device, the consumer may select the photo processing services the consumer wishes for the downloaded image data The consumer may then submit the image data to the photo processing service of the shopping establishment. As key fob 140 may be associated with the identification of the consumer, the time taken to order prints of the image data may be reduced. As such, the consumer may shop within the shopping establishment while the image data is being processed. This reduces the need for the consumer to stand in line to request the image processing service and further, reduces the amount of information the consumer may need to input to request the image processing service.

It may be appreciated that similar services may be requested using the personal shopping device. For example, the consumer may request from the flower arrangement services that a particular arrangement be prepared. Thus, the consumer may shop while the arrangement is being prepared, thus speeding up the consumer's shopping experience. Alternatively, the consumer may request a certain cut of meat from the butcher using the personal shopping device and thus, the consumer can pick up his request without having to wait on line. Similarly, the consumer may request movie rental services, coffee orders, seafood or deli orders, hot food orders, etc.

In addition to the film processing application, the personal shopping device may enable the customer to select and transmit an order to a bakery section and/or a delicatessen section of the shopping establishment. The customer may be able to access the bakery counter services application, select item(s) for purchase, i.e., a birthday cake, identify the size of cake, the type of cake, the decoration of the cake, the writing on the cake, etc. Once the customer enters all of the bakery order information, the bakery order is transmitted from the personal shopping device through the store server 110 or application server 106, 108, to a computing device physically located at the bakery section of the shopping establishment. The customer's order may appear on a display to a worker in the bakery section. The worker may then fulfill the customer's order. Once the worker has completed the order, the worker may transmit a message to the customer's personal computing device indicating that the order is ready for pick up. If the customer has already left the shopping establishment, the customer may be notified by e-mail, telephone, etc., that the bakery order is complete.

The personal shopping device may enable the customer to select and transmit an order to a delicatessen section of the shopping establishment. The customer may be able to access the delicatessen counter services application, select item(s) for purchase, i.e., a party platter, identify the size of platter, the contents of the platter, the theme of the platter, etc. Once the customer enters all of the delicatessen order information, the order is transmitted from the personal shopping device through the store server 110 or application server 106, 108, to a computing device physically located at the delicatessen section of the shopping establishment. The customer's order may appear on a display to a worker in the delicatessen section. The worker may then fulfill the customer's order. Once the worker has completed the order, the worker may transmit a message to the customer's personal computing device indicating that the order is ready for pick up. If the customer has already left the shopping establishment, the customer may be notified by e-mail, telephone, etc., that the delicatessen order is complete.

Alternatively, the personal shopping device may enable a customer to select and purchase media. For example, the personal shopping device may provide the customer with a list of songs for purchase. The songs may be selected by the customer and downloaded on the customer's key fob, transmitted to the customer by e-mail, burned on a portable storage medium within the shopping establishment, etc.

Alternatively, the personal shopping device may enable a customer to refill a prescription at the pharmacy section of the shopping establishment. Upon selecting this option, the customer may be required to enter the prescription number and details regarding the order. The order is transmitted from the personal shopping device through the store server 110 or application server 106, 108, to a computing device physically located at the pharmacy section of the shopping establishment. The customer's order may appear on a display to a worker in the pharmacy section. The worker may then fulfill the customer's order. Once the worker has completed the order, the worker may transmit a message to the customer's personal computing device indicating that the order is ready for pick up. If the customer has already left the shopping establishment, the customer may be notified by e-mail, telephone, etc., that the pharmacy order is complete.

Narrow Casting Application

The personal shopping device may further provide narrowcasting information to a consumer. For example, if the shopping establishment was a hardware store, and the consumer was purchasing a particular tool, the system may offer information to the consumer, i.e., a how-to video providing instruction on how to use the tool. This information may be viewed using the personal shopping device, may be downloaded on the consumer's key fob 140, or may be e-mailed to the consumer's e-mail account for home viewing.

Security

It may be appreciated that security features may be implemented within the personal shopping device and/or the shopping cart to ensure that all items placed in the shopping cart for purchase are properly scanned. For example, the personal shopping device, and/or the shopping cart may incorporate a camera whereby when the camera, analyzing images taken by the camera determines that the field of view of the top of the shopping cart has been broken, the personal shopping device determines if an item was scanned within a preset period of time. If there was no item scanned, but the field of view was broken, then an alert may be generated at the personal shopping device requesting the customer properly scan the item for purchase. If the item is again not scanned within a predetermined amount of time, an alert may be generated and forwarded to store server 110 or application server 106, 108 so that a user of the server may examine the customer's shopping cart at check out to ensure all items are properly scanned.

Alternatively, the personal shopping device and/or shopping cart may incorporate a three-dimensional scanner that scans the cart, and the items included therein. The scan may then be processed to determine whether all items in the cart were properly scanned. If then items were not all properly scanned, alerts may be generated to the customer and the user as noted above.

Reporting

In addition to the reporting capabilities discussed above, it may be appreciated that based upon the type of data stored within the system and the structures of the data tables discussed herein, real-time current and historic data mining may be realized. Further, a company's return on investment may be accurately determined.

For example, assume customers may be categorized in four categories, i.e., shops little/buys little, shops little/buys a lot, shops a lot/buys little, and shops a lot/buys a lot. These categories may be based upon predetermined thresholds based on the number of times a customer shops, and how much money is spent during each shopping trip. As the customer shopping information discussed above is obtained at the personal shopping device and stored within the system, reports may be generated to determine if customers are moving from one category to another as time progresses, the company may realize a return on investment. As historic data is maintained in addition to current data, accurate return on investment values may be calculated.

Return on investment may be determined based on an individual store, a predefined group of stores, a demographic group, etc. The return on investment value may be customized for each company, as each company may establish their own predetermined thresholds for each category.

Conclusion

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or hardware alone.

Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Attached to this disclosure as Appendix A are (1) Twenty-six (26) sheets of exemplary displays that may be presented to the consumer consistent with principles of the present invention; (2) Systems and methods for enabling information management incorporating a personal computing deice: user interface/application design; (3) Systems and methods for enabling information management incorporating a personal computing device: hardware application design; (4) Systems and methods for enabling information management incorporating a personal computing device: hardware design; (5) Two (2) information sheets including features consistent with some embodiments of the present invention; all of these 5 documents are incorporated herein by reference in their entirety.

We claim:

1. A method for automatically updating location information, comprising:
    storing location information of a plurality of products;
    receiving information from a remote electronic device, wherein the received information includes information identifying a position of the remote electronic device and identifying information of one of the plurality of products;
    obtaining a current location of the one of the plurality of products;
    comparing the current location with the position of the remote electronic device;
    recording an exception when the current location of the one of the plurality of products is not within a predetermined distance from the position of the remote electronic device;
    determining the current location of the one of the plurality of products should be updated when more than one exception is recorded; and
    updating the location information of the one of the plurality of products with the position of the remote electronic device.

2. The method of claim 1, wherein the method includes:
    flagging the one of the plurality of products as potentially requiring an updated location when one exception is recorded.

3. The method of claim 1, wherein updating the location of the one of the plurality of products with the position of the remote electronic device includes storing the current location of the one of the plurality of products and storing the updated location of the one of the plurality of products.

4. The method of claim 1, wherein received information identifying the position of the remote electronic device is not received from an RFID tag.

5. A computer-readable medium storing a set of instructions, executed by a processor, to perform the method for automatically updating location information, the method comprising:
    storing location information of a plurality of products;
    receiving information from a remote electronic device, wherein the received information includes information identifying a position of the remote electronic device and identifying information of one of the plurality of products;
    obtaining a current location of the one of the plurality of products;
    comparing the current location with the position of the remote electronic device;
    recording an exception when the current location of the one of the plurality of products is not within a predetermined distance from the position of the remote electronic device;
    determining the current location of the one of the plurality of products should be updated when more than one exception is recorded; and
    updating the location information of the one of the plurality of products with the position of the remote electronic device.

6. An apparatus for automatically updating location information, comprising:
    a memory storing a set of instructions; and
    a processor, executing instructions stored in memory, to perform a method for automatically updating location information, the method comprising:
        storing location information of a plurality of products;
        receiving information from a remote electronic device, wherein the received information includes information identifying a position of the remote electronic device and identifying information of one of the plurality of products;
        obtaining a current location of the one of the plurality of products;
        comparing the current location with the position of the remote electronic device;
        recording an exception when the current location of the one of the plurality of products is not within a predetermined distance from the position of the remote electronic device;
        determining the current location of the one of the plurality of products should be updated when more than one exception is recorded; and
        updating the location information of the one of the plurality of products with the position of the remote electronic device.

7. The apparatus of claim 6, wherein the method includes:
    flagging the one of the plurality of products as potentially requiring an updated location when one exception is recorded.

8. The apparatus of claim 6, wherein updating the location of the one of the plurality of products with the position of the remote electronic device includes storing the current location of the one of the plurality of products and storing the updated location of the one of the plurality of products.

9. A method for automatically updating location information, comprising:
    obtaining location information of one of a plurality of products at an electronic device and a position of the electronic device;
    transmitting the obtained location information of the one of the plurality of products and the position of the electronic device to a remote computing device;

obtaining a current location of the one of the plurality of products;

comparing the current location with the position of the electronic device;

recording an exception when the current location of the one of the plurality of products is not within a predetermined distance from the position of the electronic device; and determining the current location of the one of the plurality of products should be updated when more than one exception is recorded, wherein the location information of the one of the plurality of products is updated at the remote computing device with the position of the electronic device.

* * * * *